(12) United States Patent
Katayama

(10) Patent No.: US 7,818,446 B2
(45) Date of Patent: *Oct. 19, 2010

(54) CONTROLLING DATA TRANSMISSION ON A DATA STORAGE NETWORK BY SELECTING FROM MULTIPLE TRANSMISSION MODES

(75) Inventor: Yasushi Katayama, Tokyo (JP)

(73) Assignee: Sony Corporation, Tokyo (JP)

( * ) Notice: Subject to any disclaimer, the term of this patent is extended or adjusted under 35 U.S.C. 154(b) by 1266 days.

This patent is subject to a terminal disclaimer.

(21) Appl. No.: 10/500,146

(22) PCT Filed: Nov. 18, 2003

(86) PCT No.: PCT/JP03/14637

§ 371 (c)(1),
(2), (4) Date: Jul. 9, 2004

(87) PCT Pub. No.: WO2004/049667

PCT Pub. Date: Jun. 10, 2004

(65) Prior Publication Data

US 2005/0080916 A1    Apr. 14, 2005

(30) Foreign Application Priority Data

Nov. 28, 2002 (JP) .............................. 2002-345375

(51) Int. Cl.
*G06F 15/16* (2006.01)
(52) U.S. Cl. ..................................................... 709/232
(58) Field of Classification Search ................. 709/232, 709/218, 233
See application file for complete search history.

(56) References Cited

U.S. PATENT DOCUMENTS 5,568,614 A * 10/1996 Mendelson et al. ......... 709/231

(Continued)

FOREIGN PATENT DOCUMENTS

JP        2000-156031        6/2000

(Continued)

OTHER PUBLICATIONS

Cudre-Mauroux, Philippe et al; A Decentralized Architecture For Adaptive Media Dissemination; Aug. 28, 2002; Multimedia and Expo, 2002, ICME '02 Proceedings, 2002 IEEE International Conference; vol. 1, pp. 533-537, ISBN 0-7803-7304-9.*

(Continued)

*Primary Examiner*—Philip C Lee
*Assistant Examiner*—Jeffrey Nickerson
(74) *Attorney, Agent, or Firm*—Oblon, Spivak, McClelland, Maier & Neustadt, L.L.P.

(57) ABSTRACT

An information processing apparatus configured to transmit a data reproduction process request to a node and execute a data reproduction process based on return data, including a data transmission rate setting unit configured to select one or more data transmission modes as a return data transmission mode and determine a data transmission rate of each selected data transmission mode, a packet generating unit configured to perform a setting process for reproduction object data and an address setting process in accordance with the data transmission rate determined by the data transmission rate setting unit, and generate a data reproduction process request packet storing designation data for the set reproduction object data as a request statement, a network interface unit configured to transmit the packet, and a rule judgment condition setting unit configured to set judgment data for judging whether the node executes a process satisfying the a process request.

15 Claims, 32 Drawing Sheets

U.S. PATENT DOCUMENTS

| | | | | |
|---|---|---|---|---|
| 5,699,369 | A * | 12/1997 | Guha | 714/774 |
| 5,996,014 | A * | 11/1999 | Uchihori et al. | 709/226 |
| 6,085,019 | A * | 7/2000 | Ito et al. | 386/52 |
| 6,195,622 | B1 * | 2/2001 | Altschuler et al. | 703/2 |
| 6,253,246 | B1 * | 6/2001 | Nakatsuyama | 709/233 |
| 6,282,240 | B1 * | 8/2001 | Fukunaga et al. | 375/240.01 |
| 6,292,834 | B1 * | 9/2001 | Ravi et al. | 709/233 |
| 6,606,698 | B2 * | 8/2003 | Fradette | 711/209 |
| 6,678,855 | B1 * | 1/2004 | Gemmell | 714/752 |
| 6,775,020 | B2 * | 8/2004 | Fukunaga et al. | 358/1.15 |
| 6,876,668 | B1 * | 4/2005 | Chawla et al. | 370/468 |
| 6,909,726 | B1 * | 6/2005 | Sheeran | 370/468 |
| 6,912,385 | B2 * | 6/2005 | Namba et al. | 455/419 |
| 6,970,939 | B2 * | 11/2005 | Sim | 709/236 |
| 6,973,140 | B2 * | 12/2005 | Hoffman et al. | 375/298 |
| 7,143,143 | B1 * | 11/2006 | Thompson | 709/217 |
| 7,191,246 | B2 * | 3/2007 | Deshpande | 709/233 |
| 7,222,185 | B1 * | 5/2007 | Day | 709/232 |
| 7,260,601 | B1 * | 8/2007 | Day et al. | 709/203 |
| 2003/0055988 | A1 * | 3/2003 | Noma et al. | 709/228 |
| 2003/0072269 | A1 * | 4/2003 | Teruhi et al. | 370/252 |
| 2003/0101272 | A1 * | 5/2003 | Kaneko et al. | 709/231 |
| 2004/0042479 | A1 * | 3/2004 | Epstein et al. | 370/432 |
| 2004/0064719 | A1 * | 4/2004 | de Jong et al. | 713/200 |

FOREIGN PATENT DOCUMENTS

JP     2001-028739     1/2001

OTHER PUBLICATIONS

Rodriguez et al; "Dynamic Parallel Access to Replicated Content in the Internet"; IEEE; IEEE/ACM Transactions on networking; vol. 10, No. 4; Aug. 2002; pp. 455-465.*

* cited by examiner

FIG. 10

| DATA ID | DATA CONTENTS | HASH VALUE (MD5) OF DATA ID | HASH VALUE (MD5) OF DATA CONTENTS |
|---|---|---|---|
| abc | abcdefghijklmnopq rstuvwxyz | 900150983cd24fb0d 6963f7d28e17f72 | c3fcd3d76192e4007df b496cca67e13b |

FIG. 12

| HEADER | REPRODUCTION RULE JUDGEMENT CONDITION STATEMENT | REQUEST STATEMENT | FOOTER |
|---|---|---|---|

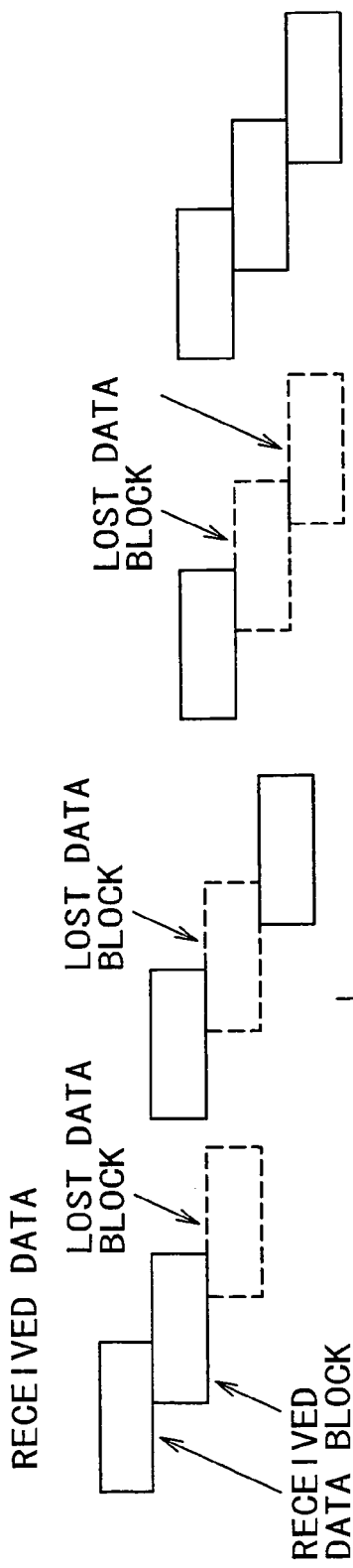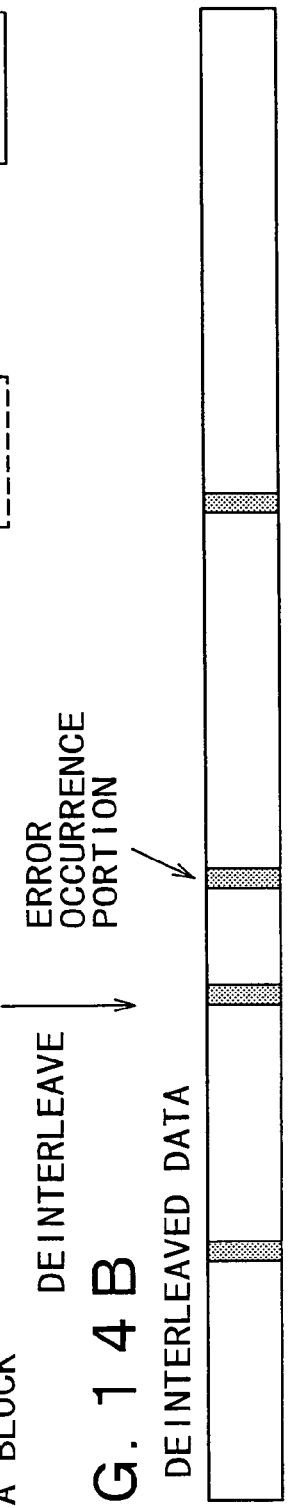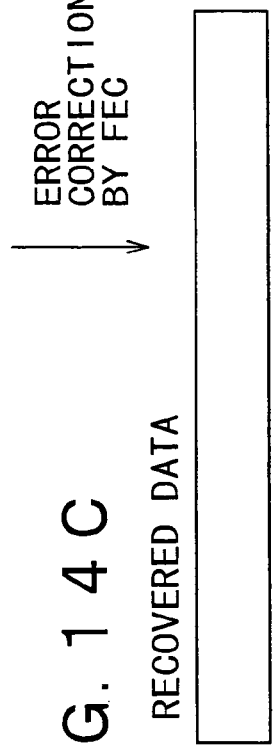

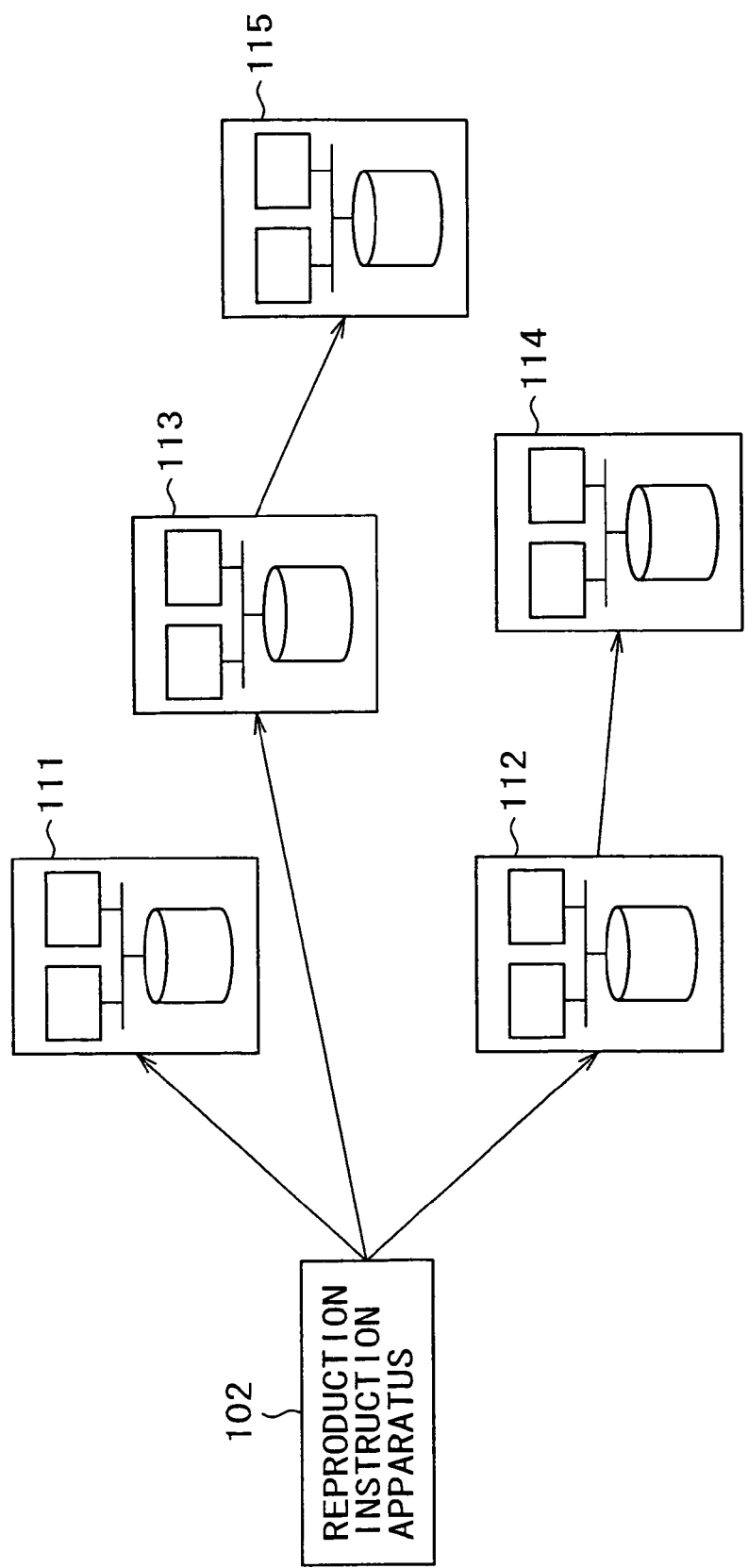

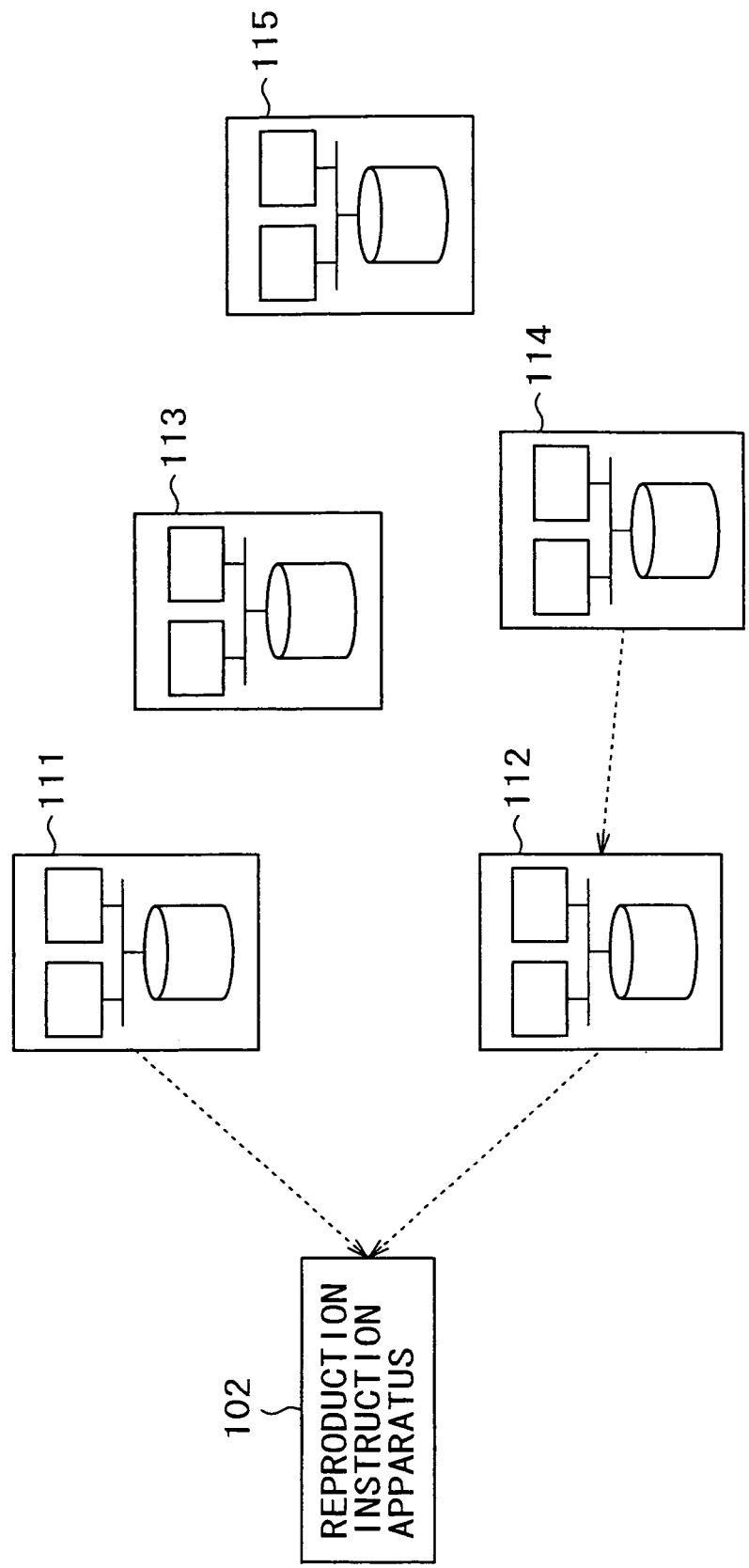

F I G. 23

| | DISTANCE | NET LOAD | DATA DISCOVER DETECTION PROBABILITY | ON-DEMAND APTITUDE | TRANSMISSION LOSS | EFFICIENT DEMAND |
|---|---|---|---|---|---|---|
| CAROUSEL | FAR | SMALL | LARGE | SMALL | SMALL | QUITE LARGE |
| DISTRIBUTED CACHE (NEAR) | NEAR | SMALL | SMALL | LARGE | SMALL | LARGE |
| DISTRIBUTED CACHE (FAR) | FAR | LARGE | MIDDLE | LARGE | MIDDLE | LARGE |
| CHAINING | FAR | LARGE | LARGE | LARGE | LARGE | SMALL |
| LOCAL CACHE | NEAR | SMALL (LARGE) | SMALL | SMALL | SMALL | EFFECTIVE FOR ANY CASE |
| CLIENT SERVER | FAR | LARGE | LARGE | LARGE | SMALL | QUITE SMALL |

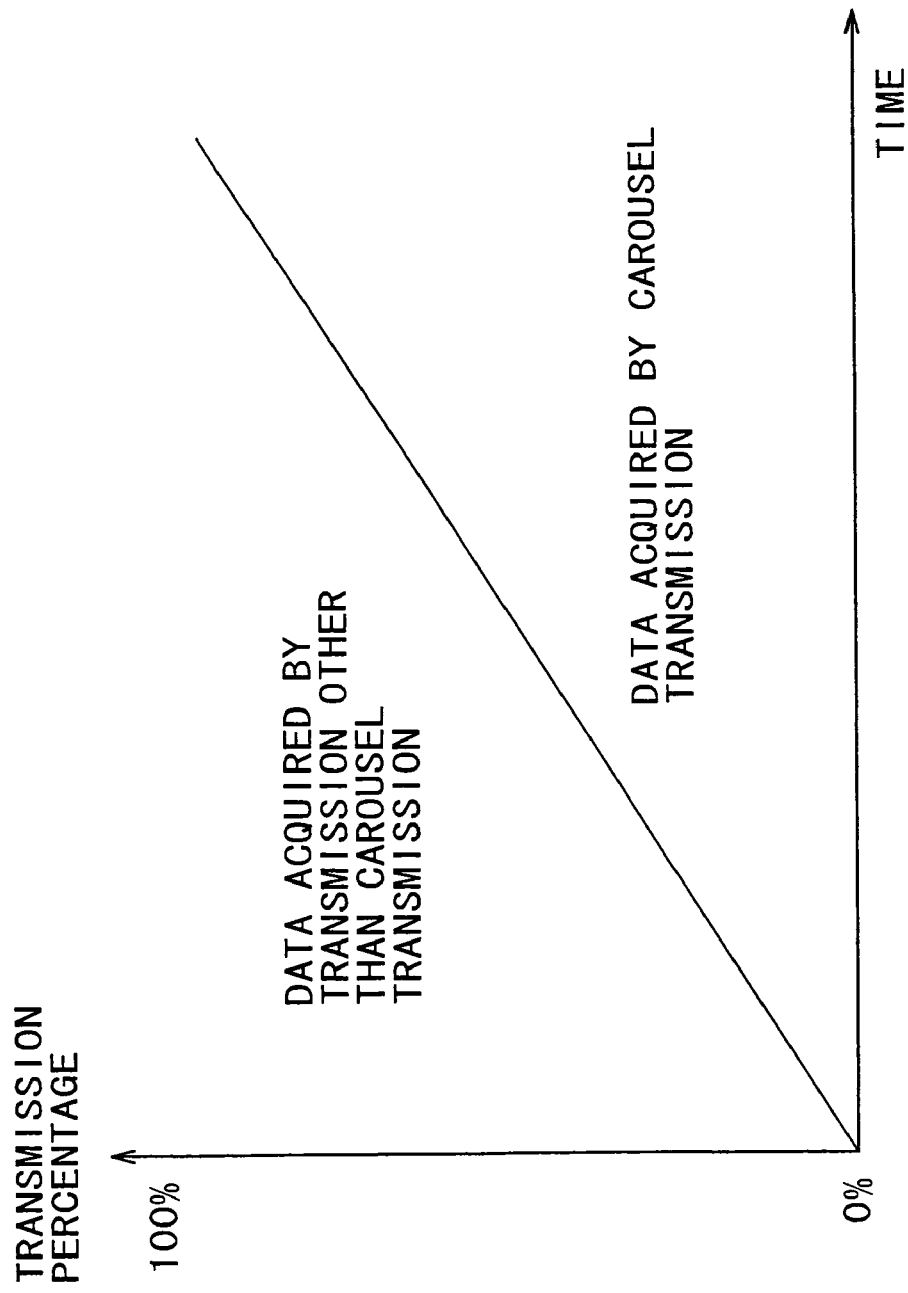

FIG. 25

| RECEPTION NODE | MULUTICAST ADDRESS |
|---|---|
| NEAREST DISTANCE NODE | 224. 200. xxx. yyy |
| NEAR DISTANCE NODE | xxx. yyy. aaa. bbb |
| MIDDLE DISTANCE NODE | ccc. sss. xxx. aaa |
| ⋮ | ⋮ |
| FAR DISTANCE NODE | ccc. bbb. xxx. aaa |
| ALL NODE | zzz. yyy. ppp. qqq |

F I G. 2 6

| DATA (CONTENTS ID) | MULUTICAST ADDRESS OR UNICAST ADDRESS |
|---|---|
| AB01266DE | 224.200.xxx.yyy |
| 65DA974E2 | xxx.yyy.aaa.bbb |
| 4638ABD564 | ccc.sss.xxx.aaa |
| ⋮ | ⋮ |
| 286EAC886D | ccc.bbb.xxx.aaa |
| ED3421850A | zzz.yyy.ppp.qqq |

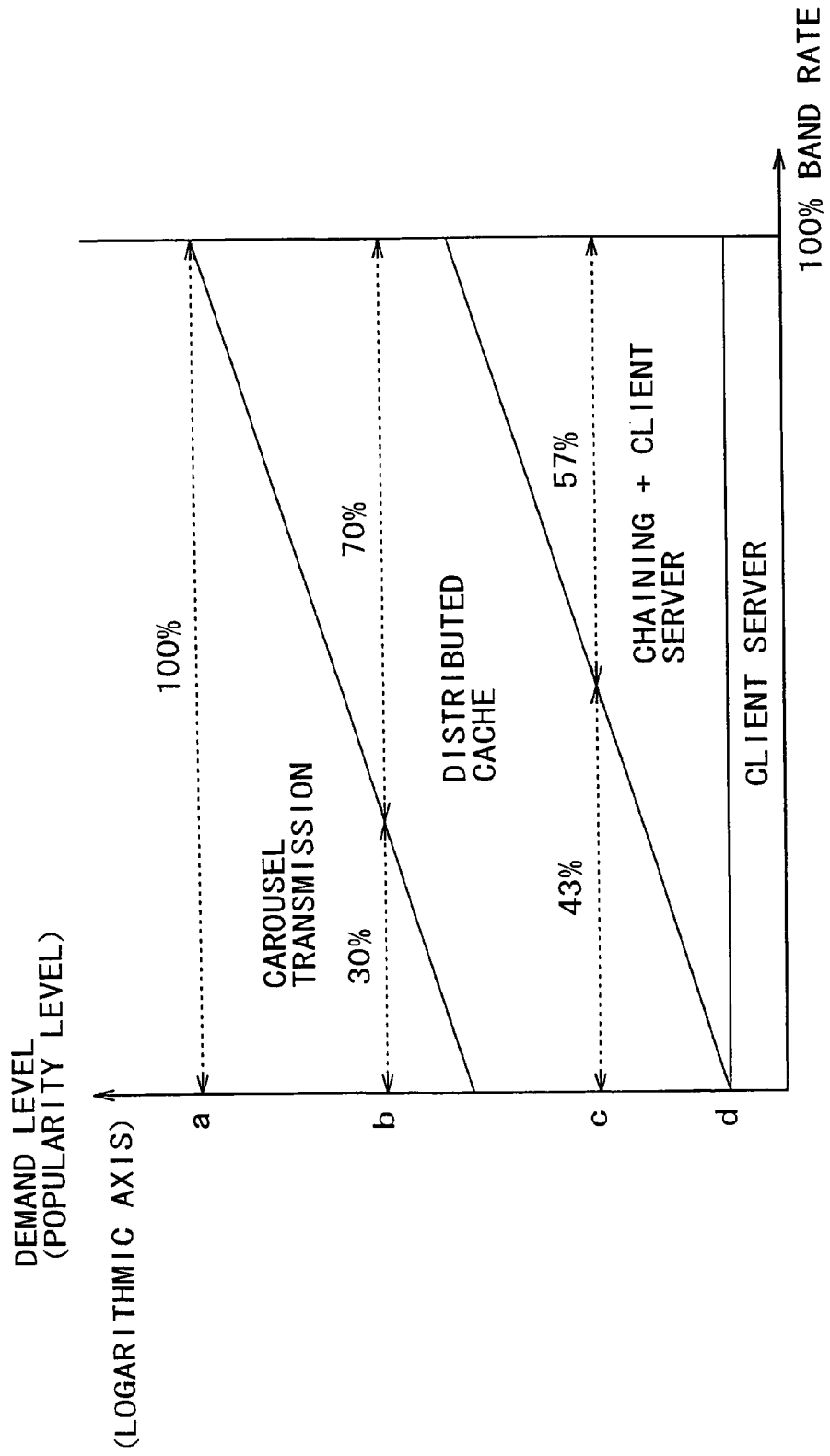

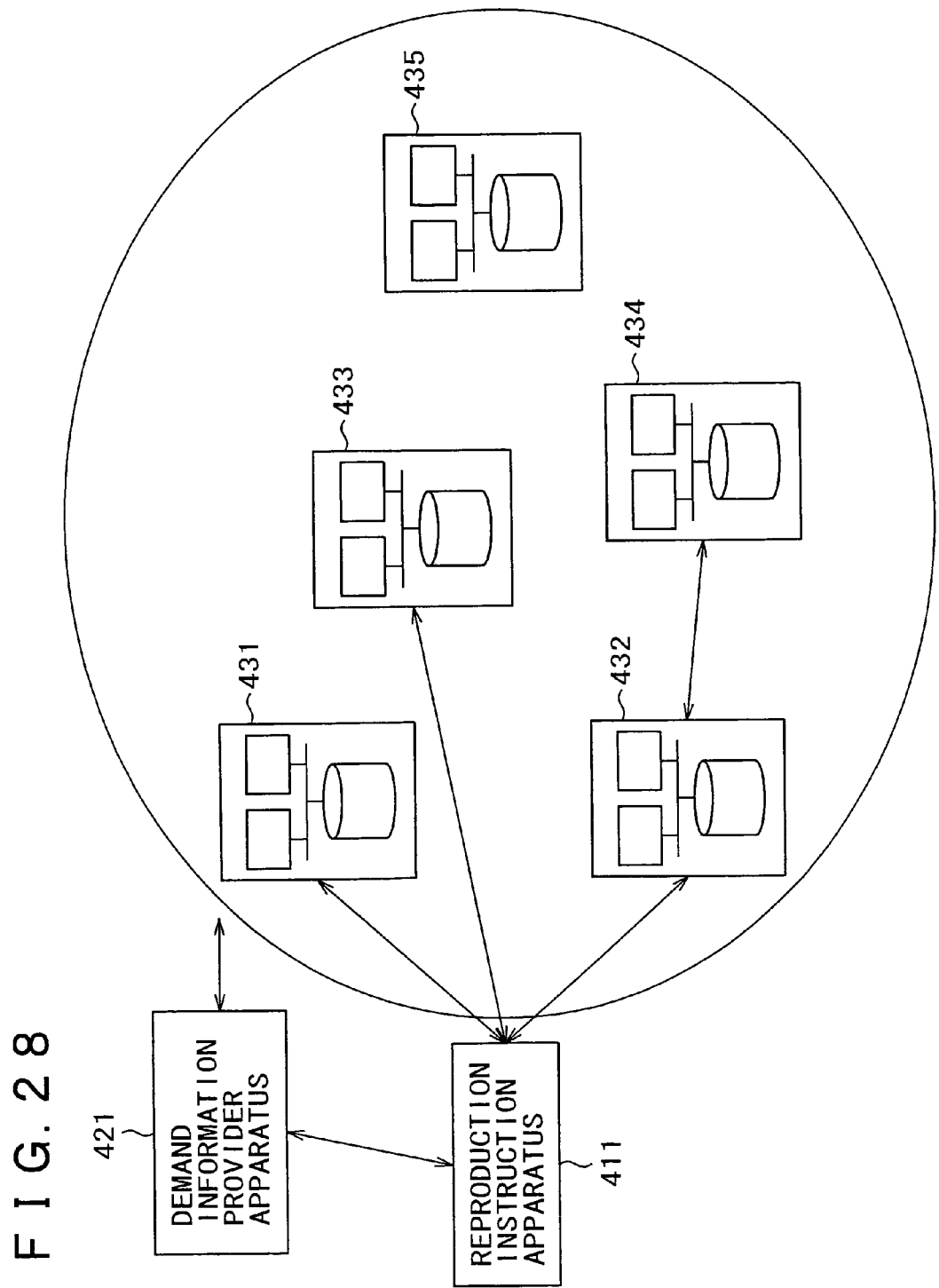

US 7,818,446 B2

CONTROLLING DATA TRANSMISSION ON A DATA STORAGE NETWORK BY SELECTING FROM MULTIPLE TRANSMISSION MODES

TECHNICAL FIELD

The present invention relates to an information processing apparatus and an information processing method, and a computer program. More particularly, the present invention relates to an information processing apparatus and an information processing method, and a computer program, wherein data reproduction at a high transmission efficiency is made possible by executing a plurality of different transmission modes combined in accordance with environments, in the configuration that data (contents) stored in distributed fashion at a plurality of nodes (information processing apparatuses) interconnected by a network or the like, or data or the like stored at a special node such as a server, is transmitted and received via the network.

BACKGROUND ART

In recent years, a communication network such as the Internet is connected to various information processing apparatuses, for example, a personal computer (PC), a large computer, a server and other communication machines, and contents such as video, image data, audio data or various programs are transferred or various processed data is transferred, among respective network-connected machines. The types of contents exchanged via a network are changing from text and still image and the like to multimedia contents such as moving image and audio.

Attention has been drawn to a large scale storage system which distributively stores some data at a number of information processing terminals interconnected by a network. In such a distributed storage system, a server which records and manages data transmits data to information processing terminals and other servers through multicasting to make the data be recorded in local recording media installed in the information processing terminals and other servers.

In this case, in order to fetch data on demand, a large amount of data is required to be recorded in recording media. For example, if a movie has a data capacity of about 2 giga bytes per one film and five hundred films of such video data are to be recorded, a capacity of 1 tera bytes is necessary.

In the case that data is supplied through streaming, if a server supplies data to a client requesting for the data through unicast, a protocol requesting data re-transmission such as an acknowledge (ACK) signal of TCP/IP is used in order to perform transmission of free of errors.

However, since this approach places a large load on a server side, even if one high performance server is used, services can be provided to only several hundred clients in a current situation. Even if a protocol not using ACK such as UDP/IP is used, the number of serviceable clients is about several thousand clients. As described above, if data is supplied through streaming, the cost on the server side increases and the number of clients is limited.

In order to deal with this, a method has been proposed recently, which transmits data to a plurality of clients without requesting for data re-transmission, by using FEC (Forward Error Correction) as multicast techniques. With this method, a server repetitively transmits a stream through multicast, and a client picks up necessary signals from this stream and decodes and reproduces the picked-up data.

In this method is used when five hundred films of video data of a movie having 2 giga bytes per film are transmitted in ten minutes, a transmission band of about 14.7 giga bit/sec becomes necessary. If the video data of the same amount is transmitted in one minute, a transmission band of about 147 giga bit/sec becomes necessary. Although these are theoretical values, a server affordable to such a capacity and transmission mode requires a very large cost, and even if such a server is realized, it is not practical. Although there is a system for distributively recording data at a plurality of hosts, if this system is to be realized, it is necessary that a plurality of servers manage a huge amount of data, so that the number of processes for data management and data communication increases.

Peer-to-Peer (P2P: Peer-to-Peer) network technologies have been developed and used recently, which provide direct communication processes among information processing apparatuses. In the configuration of a P2P network, a server for concentratedly performing processes is not installed, but each information processing apparatus each network client has as a resource communicates with each other via a network to allow each network client to share the resources, the information processing apparatus including various machines, for example, a PC, a portable terminal, a PDA, a portable phone, a disc apparatus as a storage means or a printer connected to a communication machine.

Peer-to-Peer (P2P: Peer-to-Peer) network technologies are considered to be used first in APPN (Advanced Peer to Peer Networking) advocated by IBM United States. By using this network, it is not necessary to install a giant distribution server which is required to perform contents distribution in a conventional client-serve type network, and many user can use contents distributed to the resource possessed by each network client, allowing distributed storage and distribution of a large capacity of contents.

The Peer-to-Peer (P2P: Peer-to-Peer) network has two network types: "Pure Peer-to-Peer (P2P: Peer-to-Peer) network" and "Hybrid Peer-to-Peer (P2P: Peer-to-Peer) network".

The Pure Peer-to-Peer (P2P: Peer-to-Peer) network is a network type that each constituent element (Peer) of the system has equal function•roll and performs equal communication. Typical services using this network are Gnuterlla, for example. The Hybrid Peer-to-Peer (P2P: Peer-to-Peer) network is a network type that uses a control server for smoothing interaction between respective constituent elements (Peer) of the system, in addition to the Pure Peer-to-Peer (P2P: Peer-to-Peer) network. Typical services using this network are Napster, for example.

In the Hybrid Peer-to-Peer (P2P: Peer-to-Peer) system, typically Napster, when a network-connected terminal acquires contents, first a central server searches contents resources, in accordance with the search information the terminal accesses the node (another network-connected terminal) which possesses the resource, and acquires the contents. This system has the disadvantage that resource information of all nodes is required to be registered in the central server and that searches are concentrated upon the central server.

To avoid this, a system has been proposed in which processes such as resource search are distributively executed by a plurality of apparatuses. With this process distributed system, process execution judgment apparatuses are managed, for example, by disposing the apparatuses in a tree relation, and in accordance with the management information, processes such as resource search are distributively executed by a plurality of apparatuses. This system also has some problems that as the number of process execution apparatuses becomes large, for example, several million, the amount of tree structure management information increases, the number of process commands for informing an execution command to a plurality of processing apparatuses increased, tree consistency is required to be guaranteed, and the like. Since the judgment process by a plurality of process execution judgment apparatuses is necessary, there is a problem that a process delay occurs.

There is a system mitigating these weak points in which all commands are sent to all network-connected nodes and each node is made to judge whether the received process command is executed at the node. This system is the Pure Peer-to-Peer (Pure P2P) system, typically Gnutella. Being different from the Hybrid Peer-to-Peer (Hybrid P2P) system, this system has the configuration that it does not have a central server for executing a resource search process, but a search request is directly transmitted and received at each node to perform resource search, and the hit terminal is asked to perform the process request such as contents transmission.

The configuration that if a search command is transferred, all nodes or nodes as many as possible are made to perform a search through routing of such as a tree structure and a network structure, is effective also for the Pure Peer-to-Peer (Pure P2P) system, typically Gnutella. However, this system has also a drawback that a load is placed upon a transmission route because each node executes a command transfer process for a process command not executed at the node.

For example, in order to search all network-connected nodes and make a process request arrive at all nodes, complicated routing management is necessary. On the other hand, if a node search of a best effort type is executed, it cannot be guaranteed that a command is passed to all nodes, and a necessary resource cannot be found in some cases. If communication for node search is frequently performed, there arises a problem of network congestion.

There are several data transmission modes. The first mode is a mode that all data is acquired from a single node. With this mode, although the data can be acquired reliably, a pre-search becomes necessary to judge whether the data exists. There is a problem that a load is concentrated upon the node having contents. Moreover, if a connection node becomes down, there arises a problem that data reproduction cannot continue. Data download using a single node is effective if a very few reproduction instruction apparatuses use data, i.e., if the apparatuses for receiving data from the node and reproducing it use the data. This mode has a smaller transmission loss such as packet duplication.

The second mode is a mode that a single node transfers data through carousel transmission. The carousel transmission is a data repetitive transmission mode and is named after a carousel. If multicast is used with this mode, data can be transmitted to a large number of reproduction instruction apparatuses. However, since data cannot be acquired at an arbitrary timing, in order to eliminate a data delay or the like there is no other method than to shorten a wait time by increasing the number of repetitions per unit time. Although this carousel mode is an efficient mode if there are a number of concurrently reproducing persons, it cannot satisfy both a real time performance and reproduction at an arbitrary timing. This mode also has a smaller transmission loss such as packet duplication.

The third mode is a scheme, called chaining. The chaining is a scheme that if there is a node which received data immediately before from another node, data is requested not from the other node, but the node received data immediately before is accessed and the data is made transferred from this node. Although the chaining does not ensures that the data exists surely, it can realize efficient data transmission without an excessive network load if a few reproduction instruction apparatuses use particular data. However, if a number of reproduction apparatuses are connected, the carousel transmission is more efficient.

A mode of retaining locally a number of caches is conceivable as the fourth mode. Namely, the reproduction execution apparatus caches all data. However, if such a cache mode is used, it is not practical unless the capacity of a local storage apparatus is fairly large. Although the network load during reproduction is actually zero, there is a problem that the network load during distribution is largest in all the modes.

DISCLOSURE OF THE INVENTION

Although there are various data transmission modes as described above, each mode has both merits and demerits and it can be said that a proper mode differs depending upon environments. The present invention aims to provide an information processing apparatus and an information processing method, and a computer program, capable of highly efficient data retrieval and data reproduction, by executing a plurality of different transmission modes combined in accordance with environments of the configuration that performs data processing by acquiring data, such as reproduction of contents data.

The present invention also aims to provide an information processing apparatus and an information processing method, and a computer program, capable of efficiently processing data while suppressing an increase in network traffics to be caused by transferring a number of packets, by setting the configuration of a network connected to a plurality of terminals (nodes) in such a manner that when data processing such as contents reproduction process is executed by using storage means installed at a plurality of network-connected terminals (nodes), a contents reproduction request is transmitted in accordance with predetermined rules without performing any pre-process such as node search and each terminal (node) received the request autonomously judges whether a command is executed or not to thereby selectively execute the command.

A first aspect of the present invention provides an information processing apparatus that serves as a reproduction instruction apparatus for transmitting a data reproduction process request to a node connected to a network and executing a data reproduction process based on return data, characterized by including:

a data transmission rate setting unit for selecting one or more data transmission modes to be adopted as a return data transmission mode, from a plurality of data transmission modes, and determining a data transmission rate of each selected data transmission mode;

a packet generating unit for performing a setting process for reproduction request process object data and an address setting process in accordance with the data transmission rate determined by the data transmission rate setting unit, and generating a data reproduction process request packet storing designation data for the set reproduction request process object data as a request statement; and a network interface unit for transmitting the packet generated by the packet generating unit.

Further, in one embodiment of the information processing apparatus of the present invention, the data transmission rate setting unit is characterized by having a configuration of setting the data transmission mode in accordance with a demand level of reproduction object data and determining the data transmission rate of each selected data transmission mode.

Further, in one embodiment of the information processing apparatus of the present invention, the data transmission rate setting unit is characterized by having a configuration of selecting the data transmission mode including at least either a carousel transmission mode, a chaining transmission mode, a distributed cache mode or a client server mode, and determining the data transmission rate of each selected mode.

Further, in one embodiment of the information processing apparatus of the present invention, the data transmission rate setting unit is characterized by having a configuration of having correspondence data between the demand level of the reproduction object data and a band rate as the data transmission rate of an adopted data transmission mode, selecting the data transmission mode based upon demand level information of the reproduction object data in accordance with the correspondence data, and executing a process of determining the data transmission rate of each selected mode.

Further, in one embodiment of the information processing apparatus of the present invention, the data transmission rate setting unit is characterized by having a configuration of executing a process of determining the data transmission rate of each data transmission mode in accordance with the value of a demand level: x determined by demand information by adopting a function group: $y=Dn(x)$ (where $\Sigma Dn(x)=1$) set by the demand level: x, a band rate: y for each data transmission mode and an identification value: n of each data transmission mode.

Further, in one embodiment of the information processing apparatus of the present invention, the data transmission rate setting unit is characterized by having a configuration of executing a process of setting the carousel transmission mode as the adopted data transmission mode, if the demand level of the reproduction object data is higher than a preset threshold value.

Further, in one embodiment of the information processing apparatus of the present invention, the information processing apparatus is characterized by having a configuration of further including a data recovery processing unit for executing a deinterleave process and an FEC decoding process, wherein the data recovery processing unit executes the deinterleave process and the FEC decoding process for the reproduction object data extracted from packets received from the node received the data reproduction process request, to recover data.

Further, in one embodiment of the information processing apparatus of the present invention, the information processing apparatus is characterized by having a configuration of further including a rule judgment condition setting unit for setting judgment data capable of being adopted by a process of judging whether a node received the data reproduction process request executes a process satisfying the process request, wherein the packet generating unit generates the data reproduction process request packet storing the judgment data set by the rule judgment condition setting unit and the designation data for the reproduction process object data.

Further, in one embodiment of the information processing apparatus of the present invention, the rule judgment condition setting unit is characterized by having a configuration of executing a process of setting a probability value: $\beta$ as a reproduction rule judgment condition statement capable of being adopted by the process of judging whether the node received the data reproduction process request executes the process satisfying the process request, wherein the packet generating unit generates a packet storing the probability value: $\beta$ as the reproduction rule judgment condition statement.

Further, in one embodiment of the information processing apparatus of the present invention, the information processing apparatus is characterized by having a configuration that the reproduction object data stored at the node is encoded data at an encoding rate of q/p converted from p blocks of divided data into q blocks by FEC encoding, the rule judgment condition setting unit sets a probability value: $\beta$ indicating that the node received the data reproduction process request returns data at a return probability: $\beta$, and the probability value: $\beta$ is set so that the relation, between the number of return blocks: $q \times \alpha \times n \times \beta$ able to be calculated from the record probability: a designated by a record instruction apparatus connected to the network, the number of encoded blocks: q and the number of network-connected nodes: n and the number of blocks: p, satisfies the number of return blocks: $q \times \alpha \times n \times \beta >$ the number of blocks: p.

A second aspect of the present invention provides an information processing apparatus that serves as a demand information provider apparatus for providing demand level information of transmission data over a network, characterized by including:

a communication unit for data transmission and reception to and from a network-connected node; and a control unit for counting the number of demand level information acquisition requests received from the network-connected node via the communication unit and generating demand level information for each data in accordance with the count information, generating response information corresponding to the demand level information acquisition request in accordance with the generated demand level information, and transmitting the response information via the communication unit.

Further, in one embodiment of the information processing apparatus of the present invention, the control unit is characterized by having a configuration that if the demand level for each data based upon the count information becomes equal to or larger than a preset threshold value, the control unit executes transmission control of a carousel transmission process request for data corresponding to the demand level equal to or larger than the threshold value, relative to a carousel transmission execution node.

Further, in one embodiment of the information processing apparatus of the present invention, the control unit is characterized by having a configuration that the control unit executes a process of storing an identifier of carousel transmission execution object data and carousel transmission destination address information set in accordance with transmission source node address information of the received demand level information acquisition request, in the carousel transmission process request.

A third aspect of the present invention provides an information processing method for a reproduction instruction apparatus for transmitting a data reproduction process request to a node connected to a network and executing a data reproduction process based on return data, characterized by including:

a data transmission rate setting step of selecting one or more data transmission modes to be adopted as a return data transmission mode, from a plurality of data transmission modes, and determining a data transmission rate of each selected data transmission mode;

a packet generating step of performing a setting process for reproduction request process object data and an address setting process in accordance with the data transmission rate determined by the data transmission rate setting step, and generating a data reproduction process request packet storing designation data for the set reproduction request process object data as a request statement; and a packet transmission step for transmitting the packet generated by the packet generating step.

Further, in one embodiment of the information processing method of the present invention, the data transmission rate setting step is characterized by including a process of setting the data transmission mode in accordance with a demand level of reproduction object data and determining the data transmission rate of each selected data transmission mode.

Further, in one embodiment of the information processing method of the present invention, the data transmission rate setting unit is characterized by including a process of selecting the data transmission mode including at least either a carousel transmission mode, a chaining transmission mode, a distributed cache mode or a client server mode, and determining the data transmission rate of each selected mode.

Further, in one embodiment of the information processing method of the present invention, the data transmission rate setting step is characterized by executing a process of selecting the data transmission mode based upon demand level information of the reproduction object data and determining the data transmission rate of each selected mode, in accordance with correspondence data between the demand level of the reproduction object data and a band rate as the data transmission rate of an adopted data transmission mode.

Further, in one embodiment of the information processing method of the present invention, the data transmission rate setting step is characterized by executing a process of determining the data transmission rate of each data transmission mode in accordance with the value of a demand level: x determined by demand information by adopting a function group: $y=Dn(x)$ (where $\Sigma Dn(x)=1$) set by the demand level: x, a band rate: y for each transmission mode and an identification value: n of each data transmission mode.

Further, in one embodiment of the information processing method of the present invention, the data transmission rate setting step is characterized by having a configuration of executing a process of setting the carousel transmission mode as the adopted data transmission mode, if the demand level of the reproduction object data is higher than a preset threshold value.

Further, in one embodiment of the information processing method of the present invention, the information processing method is characterized by further including a data recovery processing step of executing a deinterleave process and an FEC decoding process, wherein the data recovery processing step executes the deinterleave process and the FEC decoding process for the reproduction object data extracted from packets received from the node received the data reproduction process request, to recover data.

Further, in one embodiment of the information processing method of the present invention, the information processing method is characterized by further including a rule judgment condition setting step of setting judgment data capable of being adopted by a process of judging whether a node received the data reproduction process request executes a process satisfying the process request, wherein the packet generating step generates the data reproduction process request packet storing the judgment data set by the rule judgment condition setting step and the designation data for the reproduction process object data.

Further, in one embodiment of the information processing method of the present invention, the rule judgment condition setting step is characterized by having a configuration of executing a process of setting a probability value: $\beta$ as a reproduction rule judgment condition statement capable of being adopted by the process of judging whether the node received the data reproduction process request executes the process satisfying the process request, wherein the packet generating step generates a packet storing the probability value: $\beta$ as the reproduction rule judgment condition statement.

Further, in one embodiment of the information processing method of the present invention, the information processing method is characterized in that the reproduction object data stored at the node is encoded data at an encoding rate of q/p converted from p blocks of divided data into q blocks by FEC encoding, the rule judgment condition setting step sets a probability value: $\beta$ indicating that the node received the data reproduction process request returns data at a return probability: $\beta$, and the probability value: $\beta$ is set so that the relation, between the number of return blocks: $q \times \alpha \times n \times \beta$ able to be calculated from the record probability: a designated by a record instruction apparatus connected to the network, the number of encoded blocks: q and the number of network-connected nodes: n and the number of blocks: p, satisfies the number of return blocks: $q \times \alpha \times n \times \beta >$ the number of blocks: p.

A fourth aspect of the present invention provides an information processing method for a demand information provider apparatus for providing demand level information of transmission data over a network, characterized by including:
  a step of receiving a demand level information acquisition request from a network-connected node via a communication unit;
  a step of counting the number of demand level information acquisition requests and generating demand level information for each data in accordance with the count information; and
  a step of generating a packet storing the demand level information based on the count information as response information and transmitting the packet via the communication unit.

Further, in one embodiment of the information processing method is characterized by including a step of, if the demand level for each data based upon the count information becomes equal to or larger than a preset threshold value, executing transmission control of a carousel transmission process request for data corresponding to the demand level equal to or larger than the threshold value, relative to a carousel transmission execution node.

Further, in one embodiment of the information processing method is characterized by further including a step of executing a process of storing an identifier of carousel transmission execution object data and carousel transmission destination address information set in accordance with transmission source node address information of the received demand level information acquisition request, in the carousel transmission process request.

A fifth aspect of the present invention provides a computer program for executing a process of transmitting a data reproduction process request to a node connected to a network and executing a data reproduction process based on return data, characterized by including:
  a data transmission rate setting step of selecting one or more data transmission modes to be adopted as a return data transmission mode, from a plurality of data transmission modes, and determining a data transmission rate of each selected data transmission mode;
  a packet generating step of performing a setting process for reproduction request process object data and an address setting process in accordance with the data transmission rate determined by the data transmission rate setting step, and generating a data reproduction process request packet storing designation data for the set reproduction request process object data as a request statement; and a packet transmission step for transmitting the packet generated by the packet generating step.

A sixth aspect of the present invention provides a computer program for executing a process of providing demand level information of transmission data over a network, characterized by including:

a step of receiving a demand level information acquisition request from a network-connected node via a communication unit;

a step of counting the number of demand level information acquisition requests and generating demand level information for each data in accordance with the count information; and a step of generating a packet storing the demand level information based on the count information as response information and transmitting the packet via the communication unit.

According to a configuration of the present invention, in the configuration that a data reproduction process request is transmitted to a node connected to a network and a data reproduction process based on return data is executed, one or more data transmission modes are selected and a data transmission rate of each selected mode is determined, in accordance with a data demand level (popularity level), and data transmission is performed in accordance with the determined transmission mode. Accordingly, a selection and combination of the data transmission modes such as a carousel transmission mode, a chaining transmission mode, a distributed cache mode and a client server mode is possible and data transmission by an efficient and reliable data transmission mode can be realized.

According to a configuration of the present invention, if a reproduction process is executed, the instruction apparatus executes either the process of selecting a data transmission mode and determining a data transmission rate of each selected mode in accordance with the correspondence data possessed by the instruction apparatus between the demand level of the reproduction object data and the band rate as the data transmission rate of the adopted data transmission mode, or the process of determining a data transmission rate of each data transmission mode in accordance with the value of the demand level: x determined by the demand information by adopting a function group: $y = Dn(x)$ (where $\Sigma Dn(x)=1$) set by the demand level: x, the band rate: y for each transmission mode and the identification value: n of each data transmission mode. It is therefore possible to execute efficiently the process of determining the transmission mode in accordance with the demand level information.

Further, according to a configuration of the present invention, if the demand level of the reproduction object data is higher than the preset threshold value, executed is the process of setting the carousel transmission mode as the adopted data transmission mode. It is therefore possible to execute the process of automatically selecting and executing the carousel transmission suitable for data transfer corresponding to the data acquisition requests from a number of nodes.

Still further, according to a configuration of the present invention, the demand information provider apparatus for providing demand level information of transmission data over the network counts the number of demand level information acquisition requests from each network-connected node, and in accordance with the count information, generates and provides the demand level information for each data. It is therefore possible to grasp the demand level information in real time and supply the latest demand level information.

Furthermore, according to a configuration of the present invention, if the data demand level based upon the count information measured by the demand information provider apparatus for providing demand level information of transmission data over the network becomes equal to or larger than the preset threshold value, the transmission control for the carousel transmission process request for the data corresponding to the demand level equal to or larger than the preset threshold value is executed relative to the carousel transmission execution node. It is possible to realize the optimum data transmission control immediately dealing with an increase in the demand level.

A computer program according to the present invention is, for example, a computer program capable of being supplied to a general purpose computer system capable of executing various program codes, by using a recording medium or a communication medium providing the computer program in a computer readable format, such as a CD, an FD and an MO as the recording medium and such as a network as the communication medium. By supplying such a program in the computer readable format, the processes corresponding to the program can be realized on the computer system.

Other objects, features and advantages of the present invention will become more apparent from the detailed description to be later given with reference to the embodiments of the present invention and accompanying drawings. In this specification, the system means a logical collection configuration of a plurality of apparatuses, and is not limited only to that the apparatuses having respective structures are accommodated in the same housing.

BRIEF DESCRIPTION OF DRAWINGS

FIG. 10 is a diagram explaining an example of hash values to be generated by autonomous process execution judgment at a node that received a data record process request packet from a record instruction apparatus.

FIG. 12 is a diagram explaining a structure of a data reproduction process request packet to be transmitted from a reproduction instruction apparatus.

FIG. 14 is a diagram explaining a data FEC decoding process and a data deinterleave process to be executed by a reproduction instruction apparatus.

FIG. 15 is a diagram explaining a transmission process for a data reproduction process request packet to be sent from a reproduction instruction apparatus to a node.

FIG. 16 is a diagram explaining a transmission process for a data storage packet to be transmitted from a node that received the data reproduction process request packet from a reproduction instruction apparatus.

FIG. 23 is a diagram illustrating each mode of retrieving data necessary for reproduction by a reproduction instruction apparatus and characteristics of each mode.

FIG. 24 is a diagram explaining a bandwidth narrowing effect if both carousel transmission and other transmissions are used.

FIG. 25 is a diagram showing an example of an address table used if multicast addresses are set in accordance with a distance to a reproduction instruction apparatus.

FIG. 26 is a diagram showing an example of an address table to which data (contents) IDs and data transmission node addresses are set.

FIG. 27 is a diagram showing a correspondence between demands and band rates, the ordinate being a logarithmic axis and representing data demand level (popularity level) and the abscissa representing a rate (band rate) adopting data retrieval modes.

FIG. 28 is a diagram showing an example that a demand information provider apparatus for providing demand information is installed on a network.

BEST MODE FOR CARRYING OUT THE INVENTION

With reference to the accompanying drawings, detailed description will be made on an information processing apparatus and an information processing method, and a computer program. The description will be made in the order of the following items.

Figure 1:
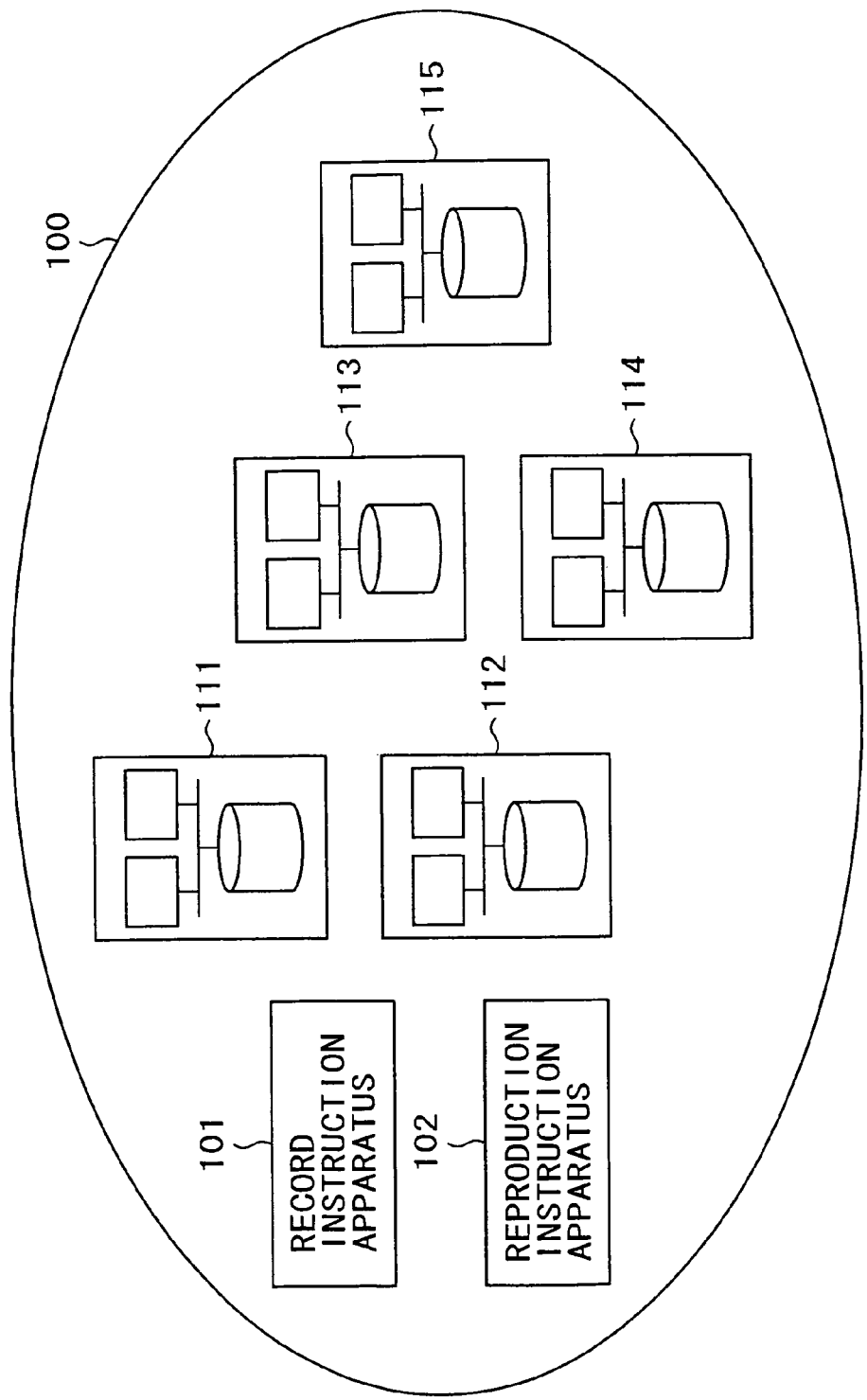
FIG. 1 is a diagram explaining an example of a configuration of a distributed storage system to which the present invention is applicable.

1. Network Configuration
2. Structure of Information Processing Apparatus Serving as Node
3. Structure of Record Instruction Apparatus and Data Record Process
4. Structure of Reproduction Instruction Apparatus and Data Reproduction Process
5. Data Record Reproduction Process Sequence
6. Data Transmission Process by Optimum Combination of Transmission Modes
7. Hardware Structure of Information Processing Apparatus 1. Network Configuration With reference to FIG. 1, description will be made first on an example of the configuration of a network which realizes data processing adopting an information processing apparatuses of the present invention. FIG. 1 shows a specific example of a distributed storage system for distributively storing data at terminals constituting the network. The distributed storage system has n nodes 111, 112, . . . , 115 connected to a network 100, a record instruction apparatus 101 for instructing and controlling each node to record data, and a reproduction instruction apparatus 102 used for reading data recorded in each node.

In the present embodiment, although the record instruction apparatus 101, each node 111-115 and the reproduction instruction apparatus 102 are described as discrete apparatuses, a record reproduction instruction apparatus having the functions of both the apparatuses may be used. Each node may have the function of the record instruction apparatus or reproduction instruction apparatus. In this case, each apparatus constituting the network can be used indistinguishably. The record instruction apparatus, reproduction instruction apparatus and nodes are collectively called the information processing apparatus.

Figure 2:
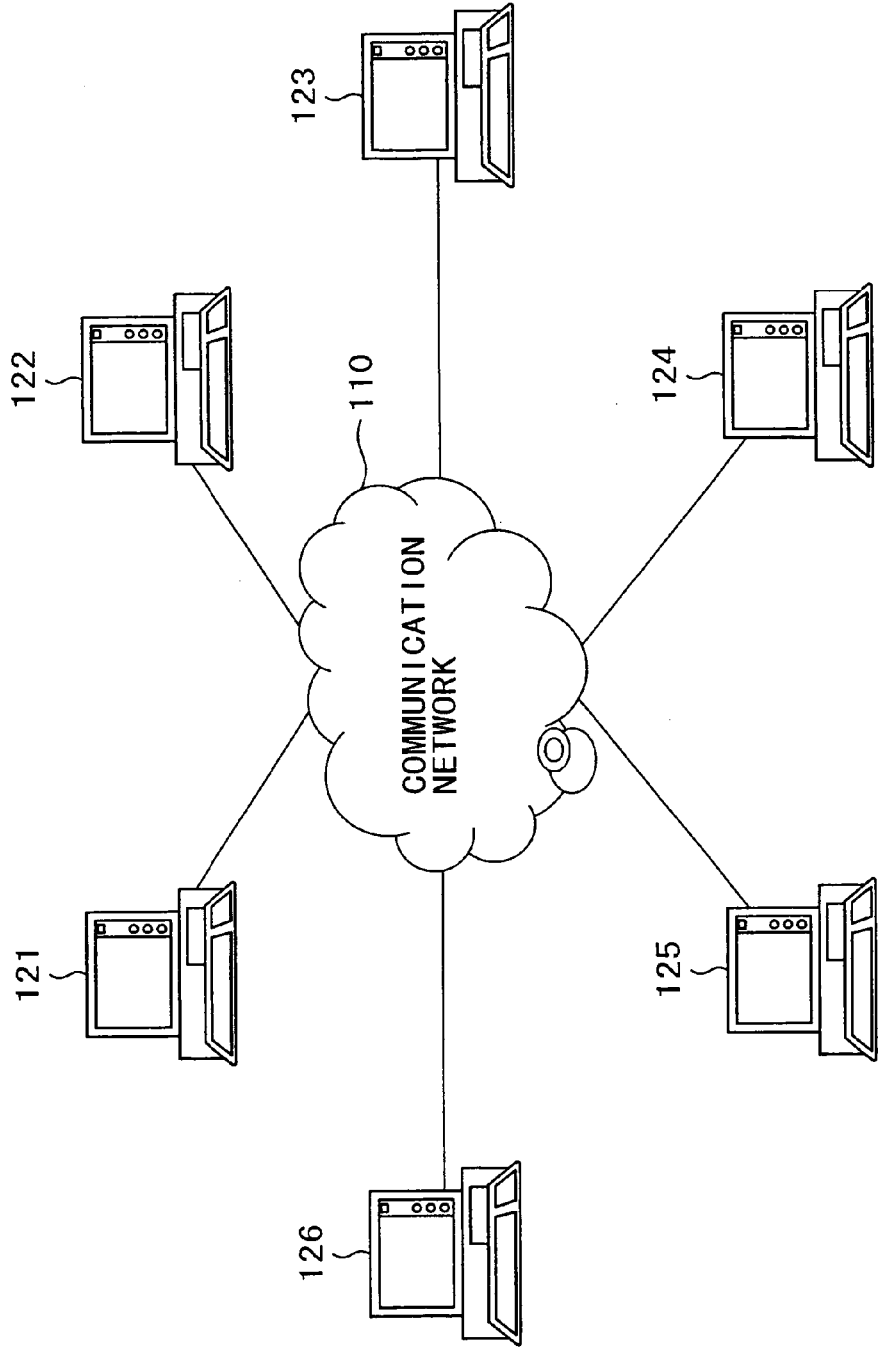
FIG. 2 is a diagram explaining an example of a configuration of a network to which the present invention is applicable.

Namely, a network configuration such as shown in FIG. 2 is conceivable. Information processing apparatuses have the structures capable of communicating with other information processing apparatuses and are interconnected by a communication network. The network is basically a Pure Peer-to-Peer (P2P: Peer-to-Peer) network not having a control server functioning as a Look-up Server.

As shown in FIG. 2, information processing apparatuses 121 to 126 communicate with each other via a network 110 and execute various data processing such as a contents record process and a contents reproduction process. The present invention is also applicable to the Hybrid Peer-to-Peer (P2P: Peer-to-Peer) network having a control server, is not intended to be applicable only to a limited network configuration, and is applicable to other networks if they allow information processing apparatuses to communicate with each other.

One of the information processing apparatuses 121 to 126 shown in FIG. 2 outputs a contents record request or a contents reproduction request to network-connected information processing apparatuses. If the contents record request is to be performed, record request process request packets set with multicast addresses in accordance with, for example, predetermined rules are generated, and contents subjected to FEC (Forward Error Correction) and interleaved are stored in the packets as division data, and then the packets are transmitted to other information processing apparatuses. The information processing apparatuses received these packets autonomously judge whether the data record process is executed, and in accordance with the judgment a contents record process is executed.

If the contents reproduction process is to be executed, one of the information processing apparatuses 121 to 126 transmits a contents reproduction request to other information processing apparatuses by generating request packets set with multicast addresses in accordance with, for example, predetermined rules. The information processing apparatuses received these packets autonomously judge whether a data extraction process is executed, and in accordance with the judgment a contents extraction process is executed. The data extracted in accordance with the request, subjected to, for example, FEC (Forward Error Correction) and interleaved, is stored in packets which are transmitted to the reproduction request information processing apparatus.

In FIGS. 1 and 2, although transmission control apparatuses such as routers constituting the network are shown omitted, the transmission control apparatuses such as a router for selecting a route of a packet passing each node are actually installed. A transmission control apparatus may be provided separately from each node, or the node may have the function of a transmission control apparatus.

2. Structure of Information Processing Apparatus as Node

Figure 3:
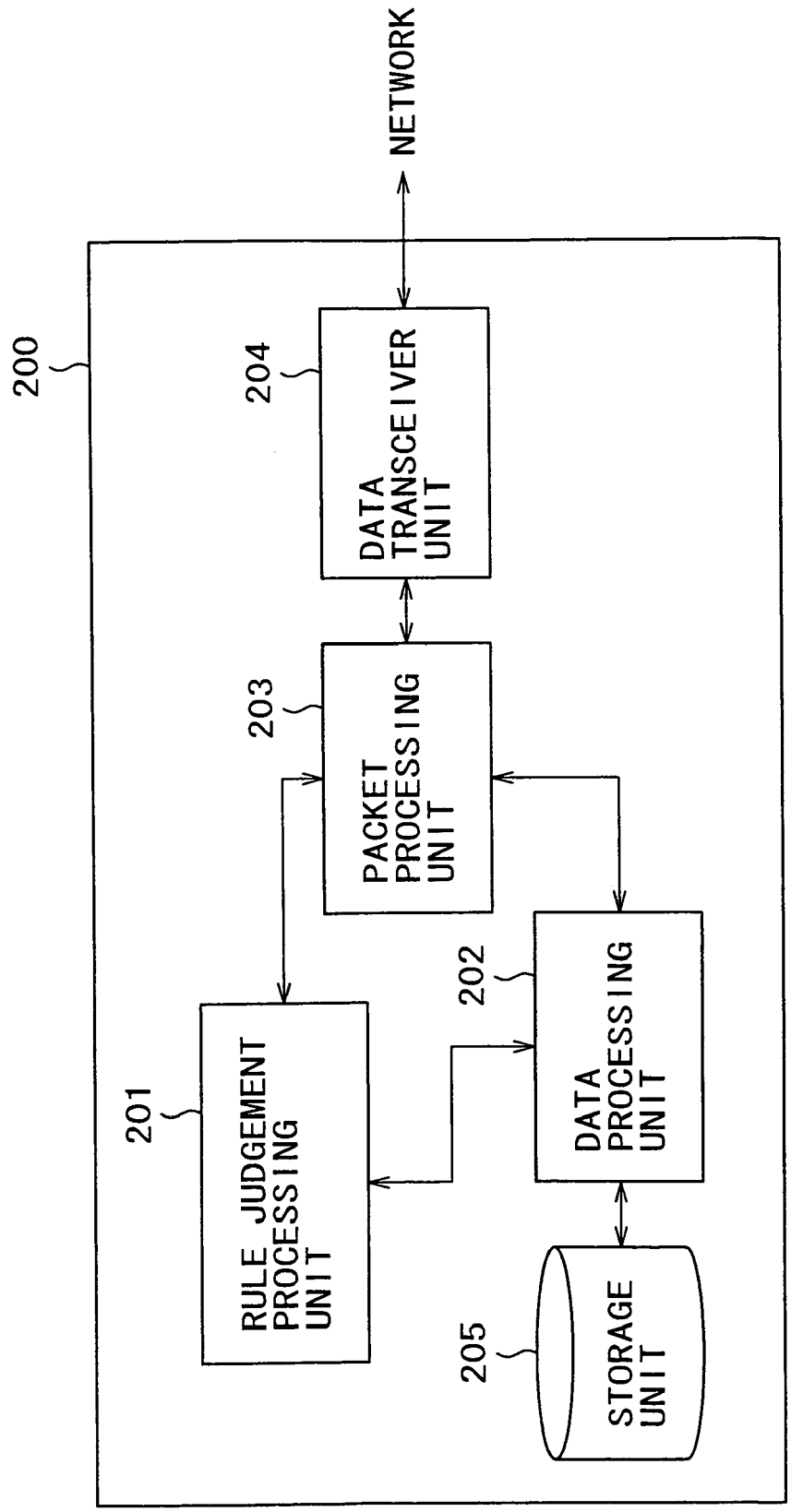
FIG. 3 is a diagram explaining a structure of an information processing apparatus (node) connected to a network.

Next, description will be made on the structure of the information processing apparatus functioning as a node. FIG. 3 is a diagram showing the structure of the information processing apparatus functioning as a node.

As shown in FIG. 3, an information processing apparatus (node) 200 has a rule judgment processing unit 201, a data processing unit 202, a packet processing unit 203 and a data transceiver unit 204. The data transceiver unit 204 outputs a transmission packet to another information processing unit connected to the network and executes an input process for a reception packet from another information processing apparatus.

The packet processing unit 203 performs a process of generating a packet which is transmitted from its own apparatus to another information apparatus connected to the network, a process of analyzing a packet received from another information processing apparatus, and other processes.

The data processing unit 202 performs a process in accordance with a data processing program stored in the information processing apparatus. For example, this process is data processing performed in response to a data processing request from an information processing apparatus such as another record instruction apparatus or reproduction instruction apparatus connected to the network. For example, if the request is a contents reproduction request, the data processing is a process of extracting designated contents from a storage unit 205 and outputting the designated contents to the packet processing unit 203. If the request is a contents record request, the data processing is a process of storing input contents in the storage unit 205.

The rule judgment processing unit 201 executes a process inherent to the information processing apparatus of the present invention. The rule judgment processing unit executes data processing for the packet in accordance with a probability value: $\alpha$ or $\beta$ as "rule judgment condition statement" described in the input packet, e.g., a data reception process corresponding to a data record command and a data storage process into the storage unit, or a data extraction process from the storage unit corresponding to a data reproduction command and a data transmission process, and a process of judging whether these processes are to be executed. In the configuration of the present invention, a probability of executing a record command is set to a and a probability of executing a reproduction command is set to $\beta$, and these probability values are set to the record request packet and reproduction request packet transmitted from the record instruction apparatus and reproduction instruction apparatus, respectively.

For example, if the contents record process is executed, if the number n of nodes constituting the distributed storage system is sufficiently large and if the number q of decoded blocks is sufficiently large, packets are equally recorded in all nodes and data is recorded at a probability $\alpha$ in the whole distributed storage system.

If the contents reproduction process is executed, the rule judgment processing unit 201 at each node judges from the probability: $\beta$ whether the reproduction command is executed. Since the reproduction command is executed at each node only at a constant probability, packet loss occurs. However, if the probability $\beta$ is set so that the reproduction command is executed so as to make a plurality of distributed nodes send the sufficient number of packets in total, the packets are combined and error correction is performed based upon FEC (Forward Error Collection) so that the original data can be reproduced.

3. Structure of Record Instruction Apparatus and Data Record Process

Figure 4:
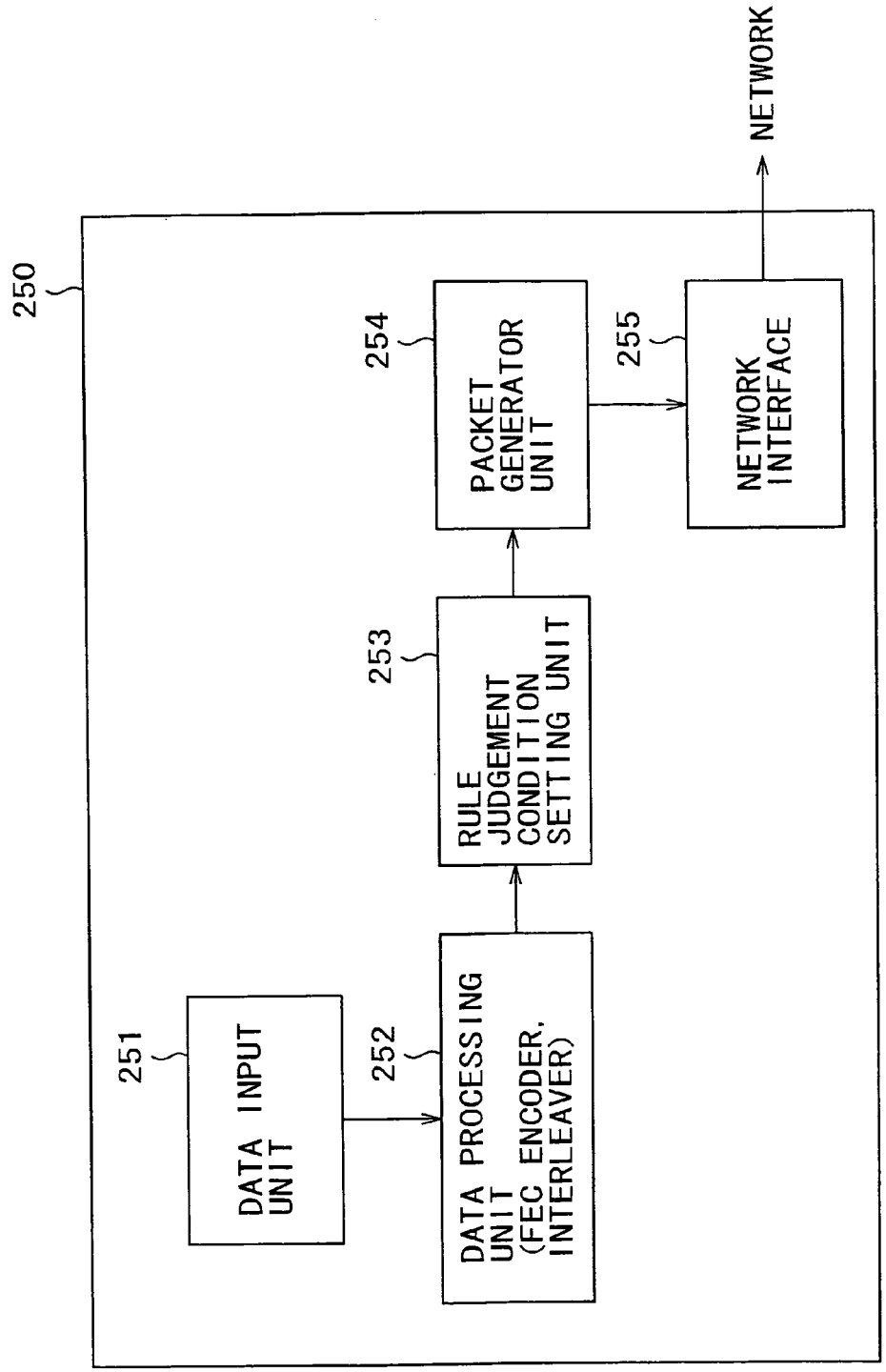
FIG. 4 is a diagram explaining a structure of a record instruction apparatus.

Next, the record instruction apparatus and the data record process will be described. FIG. 4 is a diagram showing the structure of the record instruction apparatus 250. The record instruction apparatus 250 has a data input unit 251 for inputting record process request object data (contents) for a plurality of nodes, a data processing unit 252 for processing data such as FEC (Forward Error Collection) encoding and an interleaving process for encoded data, a rule judgment condition setting unit 253 for setting the probability value: $\alpha$ as the above-described "rule judgment condition statement", a packet generating unit 254 for generating a packet which stores the processed data generated by the data processing unit 252 and the rule judgment condition statement set by the rule judgment condition setting unit 253 and is set with an address, and a network interface 255 for connection to the network.

The FEC encoding is a collective name of encoding methods for error correction on a reception side, such as a Tornade encoding method, a Reed Tornade encoding method and a Turbo encoding method. The data processing unit 252 divides data input from the data input unit 251 into p blocks, FEC encodes the p blocks to convert them into q blocks. Encoding p blocks into q blocks is called encoding at an encoding rate of q/p. By changing this encoding rate q/p, the record efficiency and transmission efficiency of the distributed storage system can be changed.

The interleaving process is a process of arranging the order of encoded data. By interleaving data, the data can be distributed so that burst errors to be generated by a packet loss can be changed to random errors. As a result, the lost data portion can be corrected by error correction based on FEC.

Figure 5:
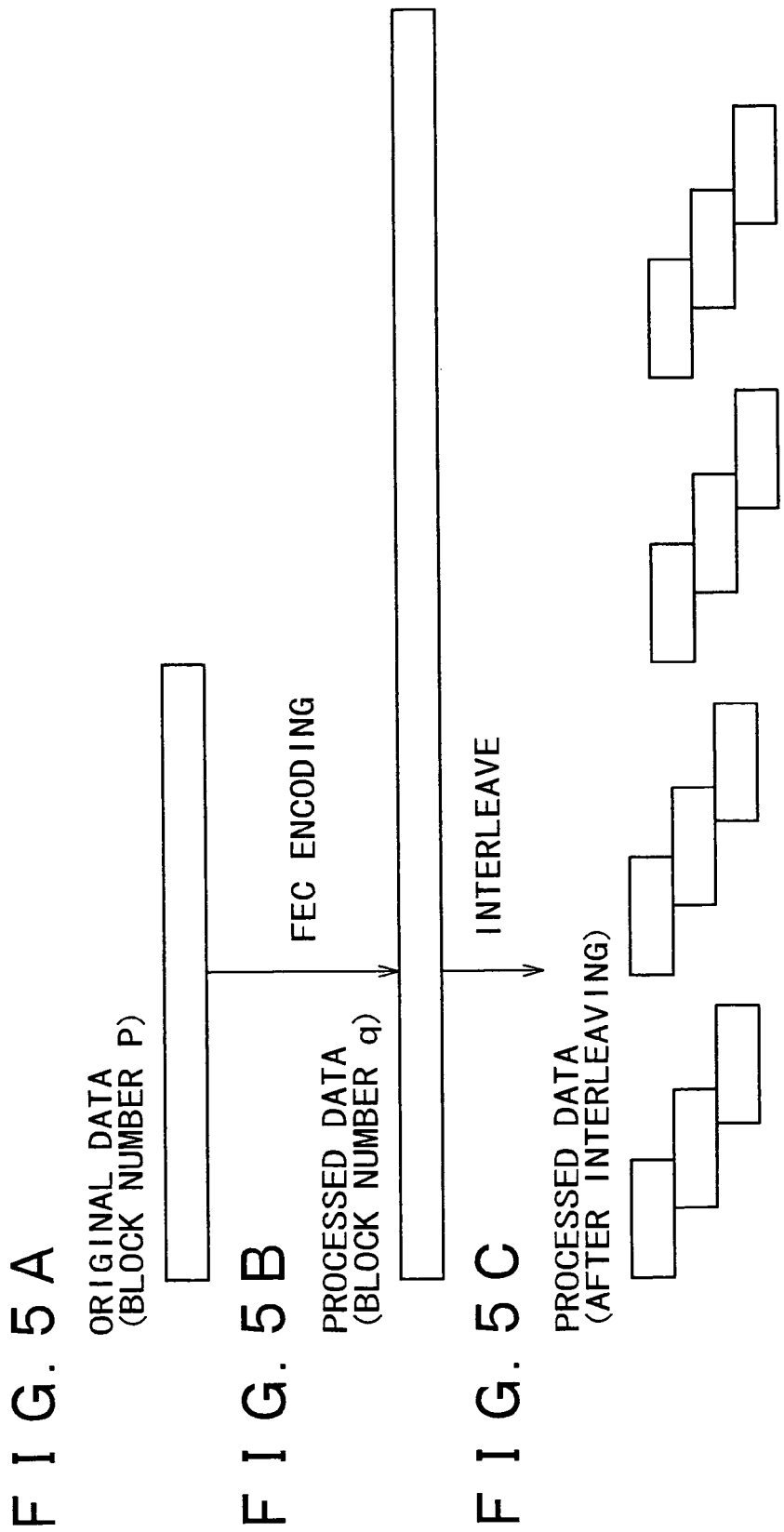
FIG. 5 is a diagram explaining a data FEC encoding process and a data interleave process to be executed by a record instruction apparatus.

The FEC encoding process and interleaving process will be described with reference to FIG. 5. As shown in FIG. 5(a), original input data is divided into p blocks. Thereafter, as shown in FIG. 5(b), FEC encoding is performed at the encoding rate of q/p to convert the data divided into p blocks into q encoded blocks.

As described above, the FEC encoding is a collective name of encoding methods for error correction on a reception side, such as a Tornado encoding method, a Reed Tornado encoding method and a Turbo encoding method. If data is encoded by the FEC encoding at the encoding rate of q/p and if p or more encoded blocks are left, the original message can be recovered even if some blocks are lost, as publicized in the paper "Effective Erasure Codes for Reliable Computer Communication Protocols" (Luigi Rizzo, Computer Comm. Rev. (April 1997), available at info.iet.unipi.it/~luigi/fec.html#fec.ps).

As shown in FIG. 5(c), the FEC encoded data is subjected to the interleaving process to arrange the order of encoded data and distribute the data. The data subjected to the interleaving process is output to the rule judgment condition setting unit 252 whereat the probability value: α is set as the above-described "rule judgment condition statement".

The probability value: α as the "rule judgment condition statement" is set in association with the process by the above-described data processing unit. Assuming that the data processing unit executes the encoding process at the encoding rate of q/p to divide data into p blocks, the rule judgment condition setting unit 253 sets as the record rule judgment statement the probability value: α meaning that the node receiving the data record process request records data at a record probability: α. The probability value: α is set so as to satisfy the following relation between the number of blocks: p and the number of return blocks: q×α×n×β which can be calculated from a return probability designated by the reproduction instruction apparatus 102 (refer to FIG. 1) connected to the network: β, the number of encoded blocks: q and the number of network-connected nodes: n.

return block number: q×α×n×β>block number: p With this setting, it can be ensured that data is reliably recovered from the return data returned from each node at the return probability: β in response to a reproduction request from the reproduction instruction apparatus.

The packet generating unit 254 divides the processed data generated by the data processing unit 252 into a predetermined size, and stores the rule judgment condition statement set by the rule judgment condition setting unit 253 to generate packets added with a header including an address and a footer and transmit them via the network interface 255. The packet is transmitted to each node constituting the distributed storage system by setting an address or addresses corresponding to a transmission node or nodes, i.e., through unicast or multicast.

Figure 6:
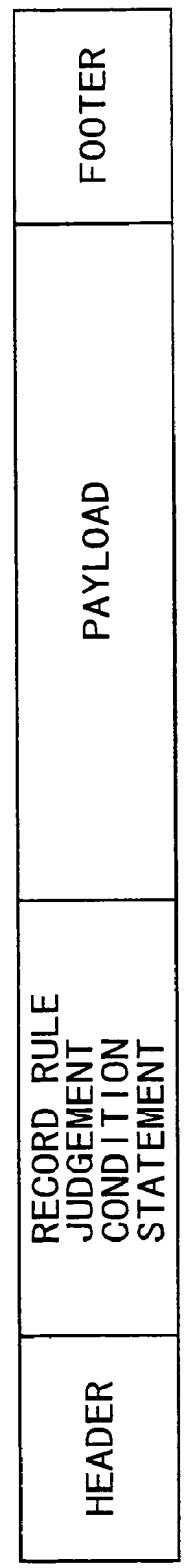
FIG. 6 is a diagram explaining a structure of a data record process request packet to be transmitted from a record instruction apparatus.

FIG. 6 is a diagram showing the structure of a packet to be generated by the packet generating unit 254. The packet is constituted of a header, a record rule judgment condition statement, a payload and a footer. The processed data (processed contents) subjected to the FEC encoding process and interleaving process are stored in the payload. Control information is described in the header and footer, the control information including a data ID indicating the type of data, a check sum of CRC (Cyclic Redundancy Check), a GUID (Global Unique ID) as an inherent identifier of a packet transmission destination node, a network address and the like.

The probability: α of recording the packet at each node to be described later is described in the record rule judgment condition statement. The rule judgment processing unit 201 (refer to FIG. 3) received the packet records the packet at this record probability α.

All the nodes constituting the distributed storage system determine from this record probability whether the packet is recorded. Therefore, data is recorded at the probability α at the node constituting the distributed storage system. In this distributed storage system, data can be distributed to nodes at an equal probability if the number n of nodes is sufficiently large and the number q of decoded blocks is sufficiently large.

The record rule judgment condition statement may be stored in a packet different from the packet storing the processed contents, link information to the packet storing the record rule judgment condition statement may be stored in the packet storing processed contents, and the node received the packet storing the processed contents may acquire the packet storing the record rule judgment condition statement in accordance with the link information.

Next, description will be made on the record procedure of the node received the record process request packet transmitted from the record instruction apparatus, the node autonomously judging whether contents are recorded and executing a process.

Figure 7:
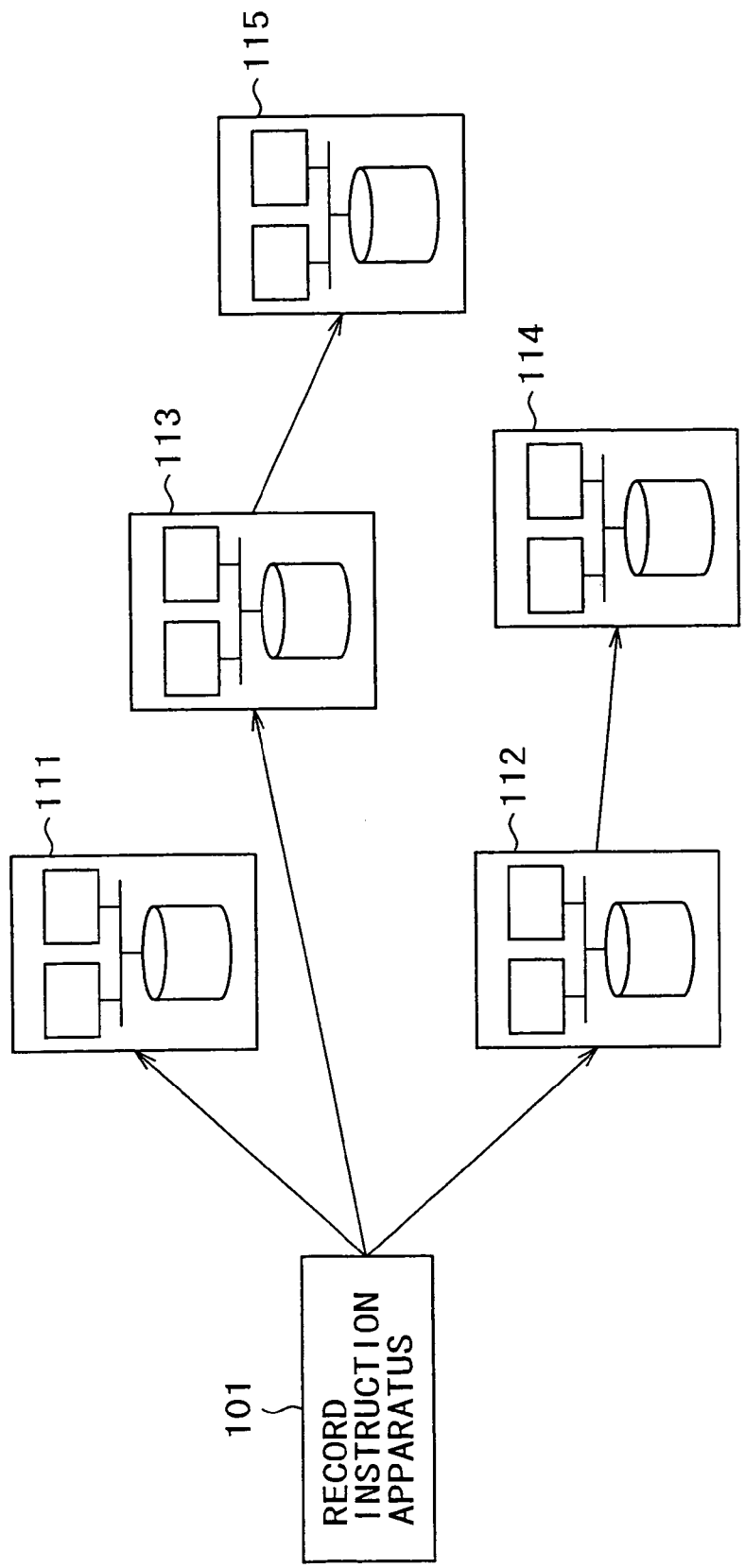
FIG. 7 is a diagram explaining a transmission process for a data record process request packet to be sent from a record instruction apparatus to a node.

FIG. 7 is a diagram explaining a process of transmitting the data record process request packet as a data record command shown in FIG. 6 from a record instruction apparatus 101 to a plurality of nodes 111 to 115. The record instruction apparatus transmits a packet to each node through unicast or multicast, the packet containing as its payload described with FIG. 6 the processed data subjected to the FEC process and interleaving process and being set with the probability value: α as the rule judgment condition statement.

Figure 8:
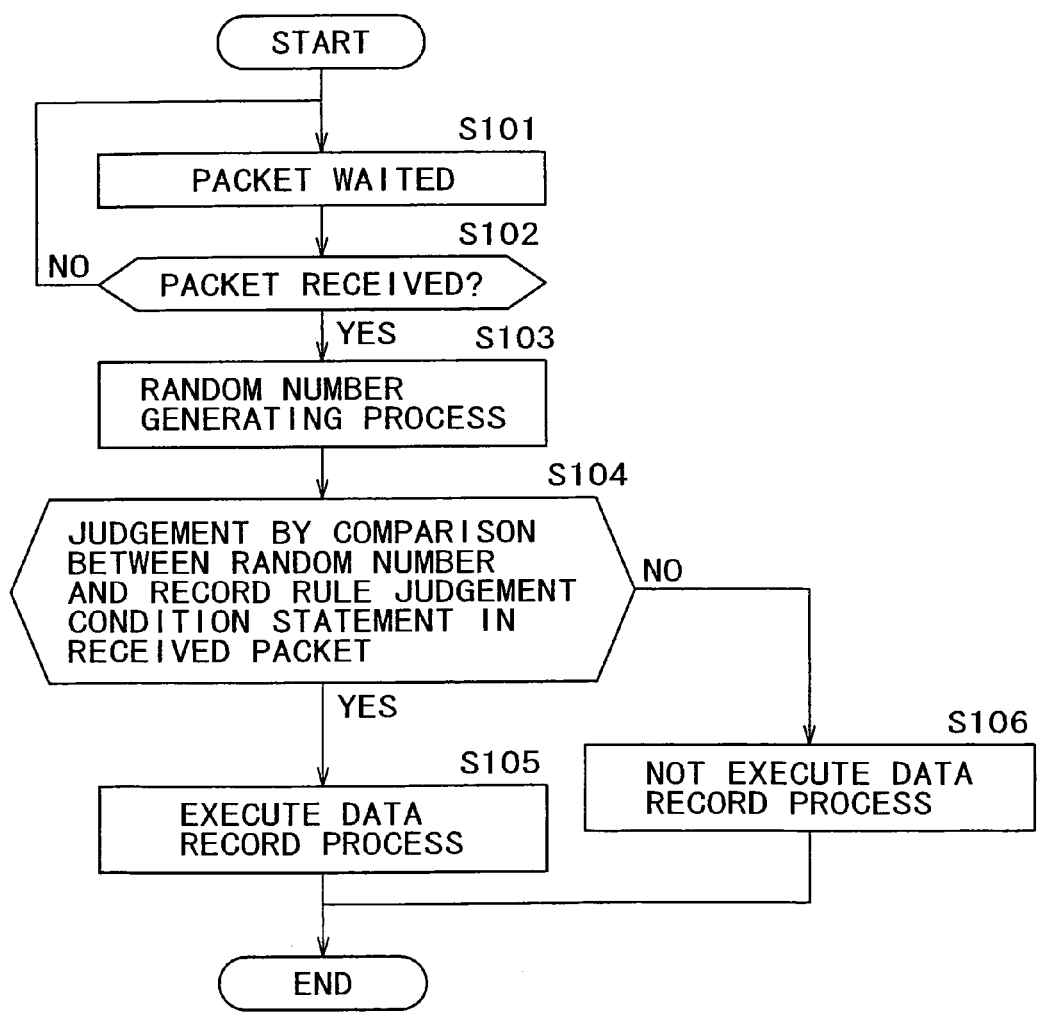
FIG. 8 is a flow chart illustrating a procedure including an autonomous process execution judgment process to be executed at a node that received a data record process request packet from a record instruction apparatus.

The procedure to be executed by the node received the packet will be described with reference to FIG. 8. First, at Step S101 the data record process request packet is waited for. If it is judged at Step S102 that the packet is received, at Step S103 a random number generating process is executed. At Step S104 the generated random number is compared with the record rule judgment condition statement: probability α stored in the data record process request packet. In accordance with the comparison result, it is judged whether the command is executed or not.

For example, if the generated random number>the probability α, executed is the process of recording the processed data stored in the payload of the packet in the storage means of the node, whereas if the generated random number≦the probability α, the data record process is not executed.

The range of the random number to be generated at each node is set so that packets are recorded in all nodes equally and data is recorded at the probability α in the whole distributed storage system, if the number n of nodes constituting the distributed storage system is sufficiently large and if the number q of decoded blocks is sufficiently large.

If the comparison result with the random number at Step S104 judges that the data record process request is executed, Step S105 follows whereat executed are a process of extracting the processed data stored in the payload of the packet and a process of recording the extracted data in the storage means of the apparatus (node). On the other hand, if the comparison result with the random number judges that the data record process request is not executed, Step S106 follows whereat the process is terminated without executing the data record process.

As described above, the information processing apparatus received the data record process request (command) autonomously judges, from the comparison between the random number and the record rule judgment condition statement stored in the packet, whether the command is executed or not, and executes the process in accordance with this judgment.

Figure 9:
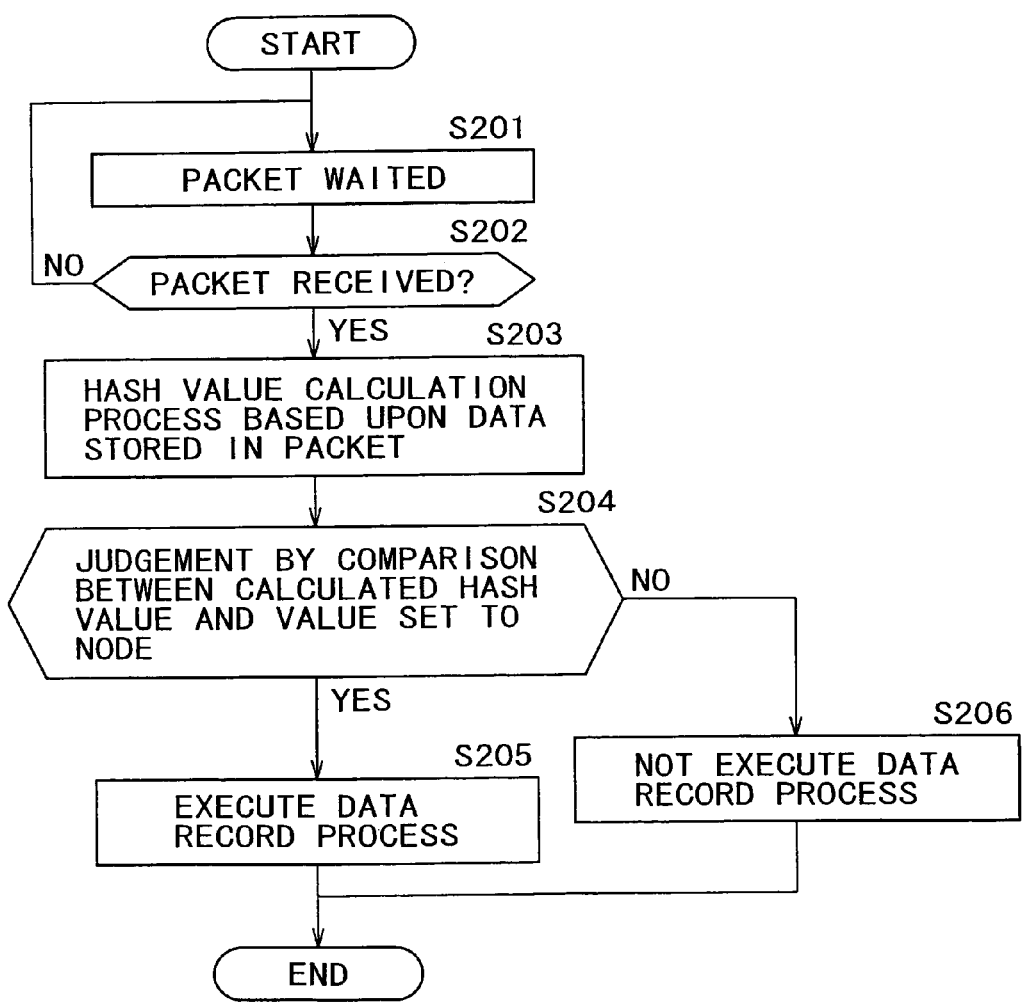
FIG. 9 is a flow chart illustrating a procedure including an autonomous process execution judgment process to be executed at a node that received a data record process request packet from a record instruction apparatus.

Next, with reference to the process flow shown in FIG. 9, description will be made on a process of calculating a hash value and autonomously judging from the hash value whether the data record process request is executed or not, on the side of the information processing apparatus received the data record process request.

First, at Step S201 the data record request packet is waited for. If it is judged at Step S202 that the packet is received, at Step S203 a hash value generating process is executed based upon the data stored in the received packet. At Step S204 it is judged from the generated hash value whether the command is executed or not.

For example, the information processing apparatus stores as a set value a preset threshold value in the storage means, and if the generated hash value>the set value, the command is executed, whereas if the generated hash value≦the set value, the command is not executed.

The data stored in the data record request packet and used for generating the hash value may be, as shown in FIG. 10, an identifier (data ID) of the contents data or a portion of data, e.g., data of a predetermined (n) bits from the data start. For example, MD5 may be used for calculating the hash value. As shown in FIG. 10, the hash value of MD5 of the data ID or the hash value of MD5 of the data contents may be used.

If the judgment result based on the hash value at Step S204 indicates that the data record process request is executed, Step S205 follows whereat executed are a process of extracting the processed data stored in the payload of the packet and a process of recording the extracted data in the storage means of the apparatus (node). On the other hand, if the comparison result with the hash value judges that the data record process request is not executed, Step S206 follows whereat the process is terminated without executing the data record process.

As described above, the information processing apparatus received the data record process request (command) autonomously judges, from the comparison between the set value at the node and the hash value stored in the packet, whether the command is executed or not, and executes the process in accordance with this judgment.

Figure 11:
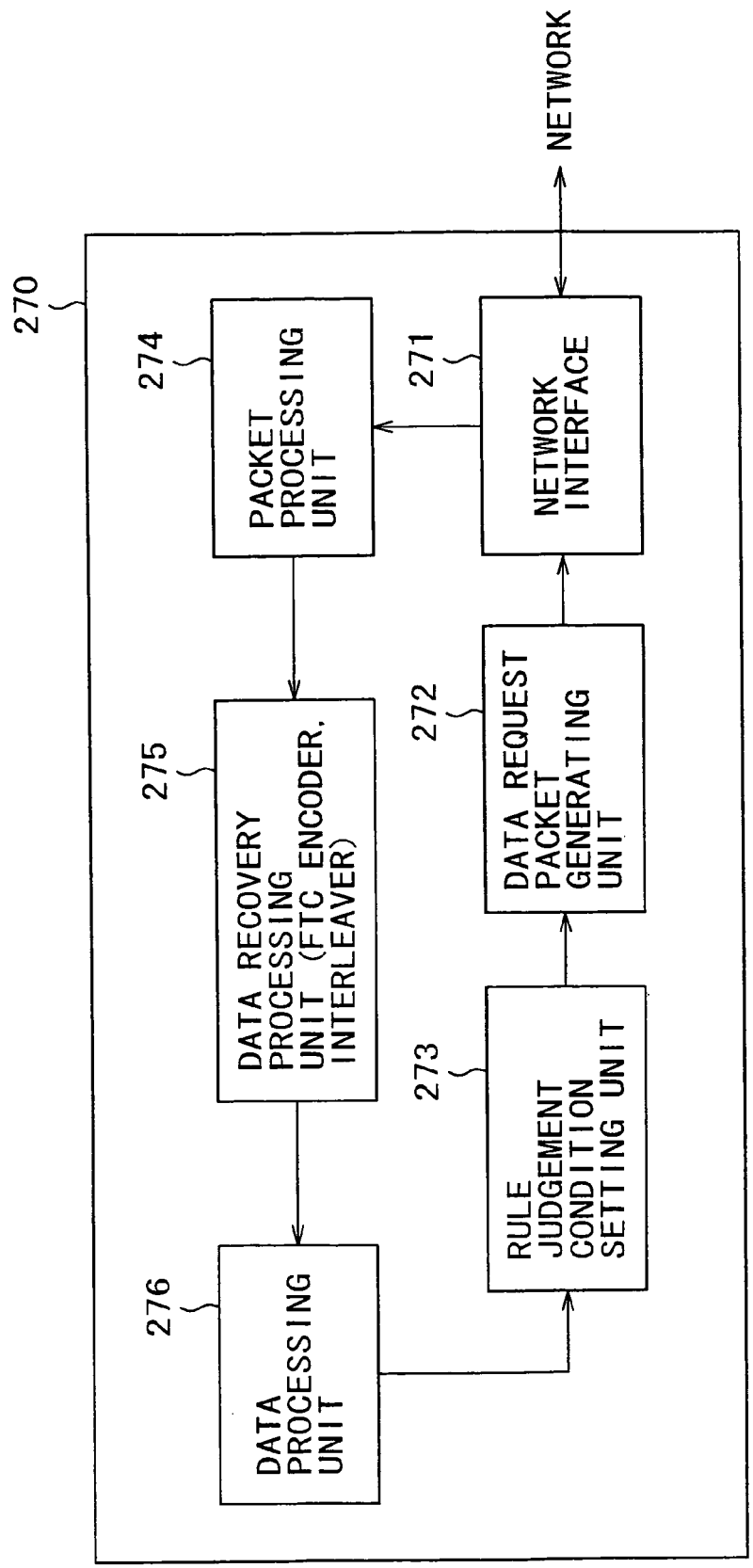
FIG. 11 is a diagram explaining a structure of a reproduction instruction apparatus.

4. Structure of Reproduction Instruction Apparatus and Data Reproduction Process Next, description will be made on the reproduction instruction apparatus 102 (refer to FIG. 1) which transmits a data reproduction instruction to each node and receives data to be reproduced from each node to execute the data reproduction process. FIG. 11 is a diagram showing the structure of a reproduction instruction apparatus 270. The reproduction instruction apparatus 270 has a network interface 271 for data transmission and reception to and from an external via the network, a data request packet generating unit 272 for generating a packet which requests a node to transmit designated reproduction data, and a rule judgment condition setting unit 273 which determines the probability value: β as the "rule judgment condition statement" set to the data request packet.

In addition, the network interface 271 receives a packet storing reproduction data from each node, and a packet processing unit 274 of the reproduction instruction apparatus 270 executes a process of coupling data divided into packets. A data recovery processing unit 275 executes a deinterleaving process and an FEC decoding process for the data extracted from the received packet to recover the contents data. The recovered data is input to a data processing unit 276 and output to an external machine such as a monitor and a speaker (omitted in the drawing) or stored in an unrepresented recording apparatus.

The data request packet generating unit 272 transmits a data request packet to each node constituting the distributed storage system. FIG. 12 is a diagram showing the structure of the data request packet. The packet is constituted of a header, a reproduction rule judgment condition statement field, a request statement field and a footer. A data ID for identifying requested data is recorded in the request statement field. Control information is described in the header and footer, the control information including a check sum of CRC, a GUID and a network address of a node, a sequence number indicating a data order, and the like.

The return probability β determined by the rule judgment condition setting unit 273 is set to the reproduction rule judgment condition statement field. The return probability β is a variable for judging whether the node received a packet returns data. There are a node judged from this variable that data is returned and a node judged from this variable that data is not returned. The return probability β is a value if the whole distributed storage system is viewed macroscopically. In the whole distributed storage system, the probability that each node returns data is β. Therefore, if there are n nodes in the distributed storage system, the percentage of returned packets is a value n×β, the number n of nodes multiplied by the return probability B.

Figure 13:
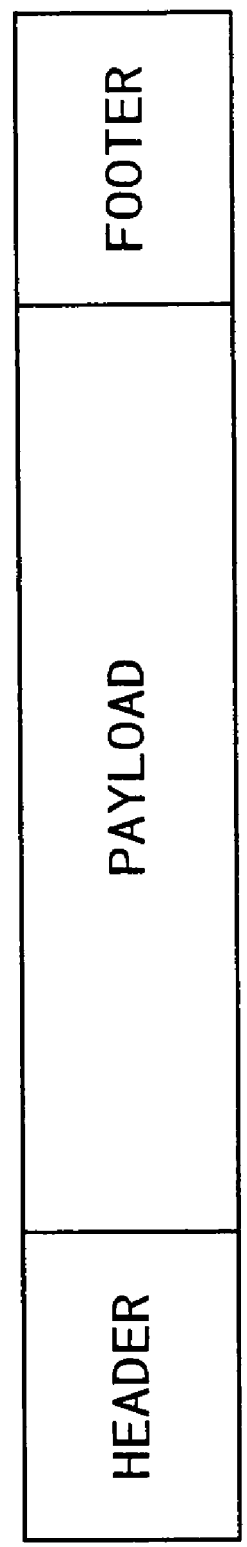
FIG. 13 is a diagram explaining a structure of a packet to be transmitted to the reproduction instruction apparatus from a node that received a data reproduction process request packet.

The packet processing unit 274 couples the packets returned from respective nodes. FIG. 13 is a diagram showing the data structure of a packet returned from a node. As shown in FIG. 13, the packet is constituted of a header, a payload and a footer. The data extracted from the storage unit of each node, i.e., the data block subjected to the FEC process and interleave process described with FIG. 5, is stored in the payload. Control in formation is stored in the header and footer, the control information including a check sum of CRC, a network address of a node on the reception side, a sequence number indicating a packet order, and the like.

When the reproduction instruction apparatus receives the packet shown in FIG. 13, the packet processing unit 274 analyzes the packet, reads the sequence number, arranges the order of received packets, removes the control information such as the header and footer, and couples the packets in the sequence number order.

The data recovery processing unit 275 deinterleaves the received data blocks to arrange the order of data and makes the deinterleaved data be subjected to the FEC decoding to recover the original data.

With reference to FIG. 14, description will be made on the data recovery process based on the FEC and deinterleaving process. As shown in FIG. 14($a$), some received packets from respective nodes are lost on the network so that there is a mixture of reception data blocks and lost data blocks.

As already described with reference to FIG. 5, the reception data block is block data subjected to the FEC encoding at the encoding rate of q/p and converted from data divided into p blocks into q encoded blocks.

The data recovery processing unit 275 of the reproduction instruction apparatus first deinterleaves the reception data blocks to arrange the order of data and generate the deinterleaved data shown in FIG. 14($b$). The deinterleaved data has lost packets, i.e., a data lost portion corresponding to the lost block. However, the deinterleave process makes these errors not the burst errors whose error portion has a large data area but the random errors having a small data area. Such random errors having the smaller data area can be corrected by FEC.

The data recovery processing unit 275 executes FEC error correction for the deinterleaved data shown in FIG. 14(*b*) to generate the recovered data shown in FIG. 14(*c*). As described earlier, the FEC encoding is a collective name of encoding methods for error correction on a reception side, such as a Tornado encoding method, a Reed Tornado encoding method and a Turbo encoding method. If data is encoded by the FEC encoding at the encoding rate of q/p and if p or more encoded blocks are left, the original message can be recovered even if some blocks are lost, as publicized in the paper "Effective Erasure Codes for Reliable Computer Communication Protocols" (Luigi Rizzo, Computer Comm Rev. (April 1997), available at info.iet.unipi.it/~luigi/fec.html#fec.ps).

The data recovered by the data recovery processing unit 275 is output to the data processing unit 276. The data processing unit 276 stores the decoded data in an unrepresented record unit or outputs it to an output unit such as a monitor and a speaker via an output interface.

The distributed storage system of the present invention is a system in which data is recorded at each node at the record probability α and data recorded at each node is returned at the return probability β. The original data output from the record instruction apparatus 101 shown in FIG. 1 is returned at the rate of α×n×β. For example, if p blocks are encoded into q blocks, q×α×n×β blocks are returned. As described in the above-described paper RIZZO97, data can be decoded if the number of returned blocks is larger than the number p of blocks before decoding. Therefore, if the values α, β and q/p are determined so as to set the number of returned blocks larger than p, the object data can be decoded.

Namely, if the reproduction object data stored in the node is the data encoded at the encoding rate of q/p by subjecting p blocks to the FEC encoding to convert them into q blocks, the rule judgment condition setting unit 273 of the reproduction instruction apparatus 270 sets the probability value: β so as to satisfy the following relation between the number of blocks: p and the number of return blocks: q×α×n×β which can be calculated from the record probability designated by the record instruction apparatus connected to the network: a, the return probability: β, and p, q, the number of encoded blocks: q and the number of network-connected nodes: n.

return block number: q×α×n×β>block number: p

With this setting, it can be ensured that data is reliably recovered from the return data returned from each node at the return probability: β in response to a reproduction request from the reproduction instruction apparatus.

As described above, the distributed storage system of this particular example sets the encoding rate q/p, record probability α and return probability β so as to satisfy $p \geq q \times \alpha \times n \times \beta$.

Therefore, by changing the encoding rate q/p, record probability α and return probability β in the range satisfying the above formula, the data record efficiency and transmission efficiency can be changed.

In the following, examples of setting each parameter of q/p, α and β will be described.

For example, for the data having a large number of return requests, the value of the record probability α is made large and the value of the return probability β is made small so that data transmitted from respective nodes is made small and the data search process and data transmission process at each node can be simplified.

Instead of making the value of the record probability α large, the value of the encoding rate q/p is made large and the return probability is made small so that the data search process and data transmission process at each node can be simplified.

If the encoding rate q/p is made small and the record probability α is made large, the number of packets to be transmitted can be suppressed. This is effective if p is sufficiently large. If the record probability α is made small and the encoding rate q/p is made small, it becomes possible to avoid that the same packet is recorded at a plurality of nodes. This is effective if p is sufficiently small.

If the return probability β is made large and record probability α or encoding rate q/p is made small, the capacity of encoded data recorded in the whole distributed storage system can be made small. Alternatively, the sufficient number of data can be returned by controlling the values α, β and q/p so that a×n×α×q×β becomes sufficiently larger than p where a is the packet loss probability at the time of data record, data output or data transmission.

If the number of unique packets returned from a plurality of nodes is arithmetically estimated and the record probability, return probability or encoding rate is made large, the probability of arrival of unique packets can be made high.

Next, description will be made on the reproduction procedure of the node received the reproduction process request packet transmitted from the reproduction instruction apparatus, the node autonomously judging whether contents are recorded and executing a process.

FIG. 15 is a diagram explaining a process of transmitting the data reproduction process request packet as a data record command shown in FIG. 12 from a reproduction instruction apparatus 102 to a plurality of nodes 111 to 115. The reproduction instruction apparatus generates and transmits the data reproduction process request packet shown in FIG. 12 to each node through unicast or multicast, the packet being set as the request statement with the identifier of the reproduction designated data such as the contents ID and GUID and set as the rule judgment condition statement with the probability value: β.

FIG. 16 illustrates that in response to the reproduction command, the node received the data reproduction process request packet shown in FIG. 12 performs the data reproduction process, i.e., reads the designated data from the storage unit of the node, and autonomously judges whether the packet generation and transmission are executed, and only if the node judged that the process is executed, generates a packet (refer to FIG. 13) and transmits it to the reproduction instruction apparatus 112, the packet storing reproduction data, i.e., the packet having as its payload the processed data subjected to the FEC process and interleave process described with FIG. 6.

Figure 17:
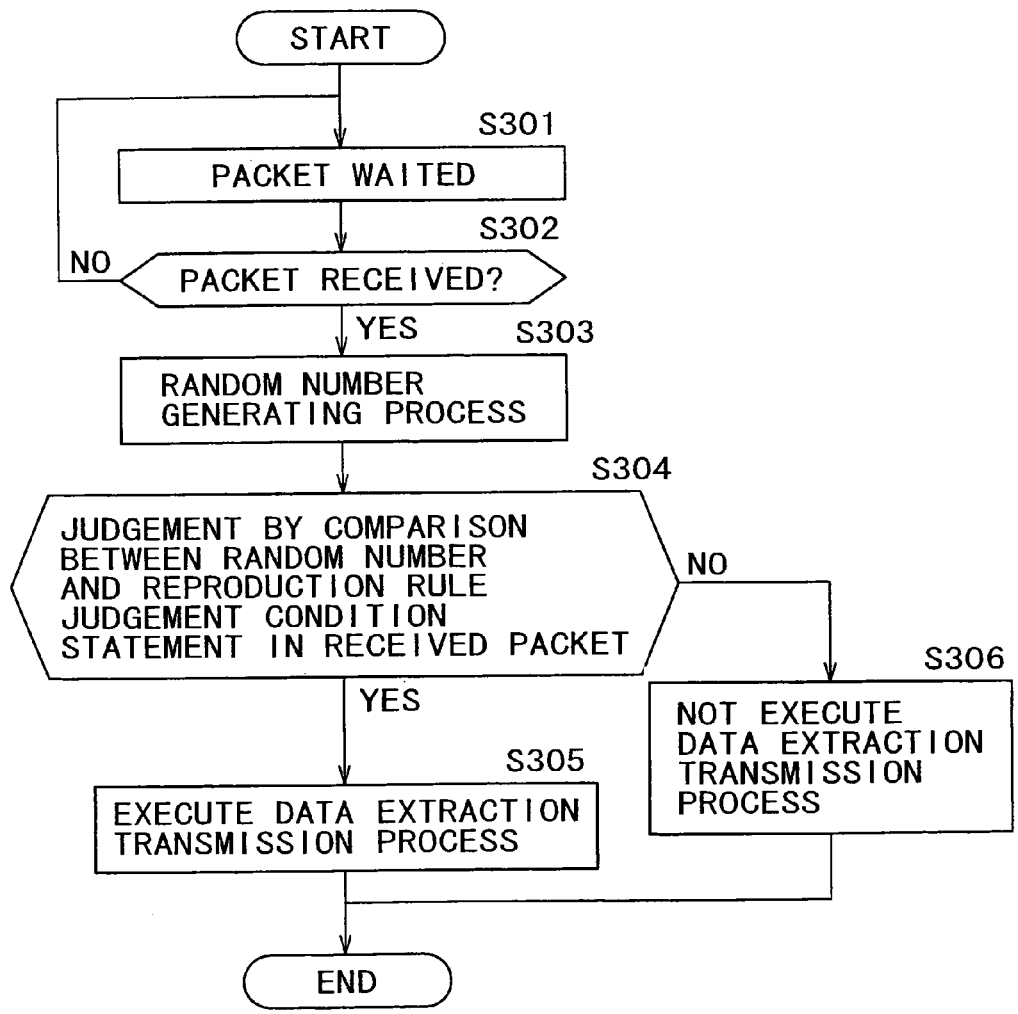
FIG. 17 is a flow chart illustrating a procedure including an autonomous process execution judgment process to be executed at a node that received a data reproduction process request packet from a reproduction instruction apparatus.

The procedure to be executed by the node received the data reproduction process request packet shown in FIG. 12 and set with the probability value: β as the rule judgment condition statement will be described with reference to FIG. 17. First, at Step S301 the data reproduction process request packet is waited for. If it is judged at Step S302 that the packet is received, at Step S303 a random number generating process is executed. At Step S304 the generated random number is compared with the record rule judgment condition statement: probability β stored in the data reproduction process request packet. In accordance with the comparison result, it is judged whether the command is executed or not.

For example, if the generated random number>the probability β, executed is the process of extracting the designated contents stored in the storage means of the node, generating the packet (refer to FIG. 13) having the extracted data as its payload, and transmitting it to the reproduction instruction apparatus, whereas if the generated random number≦the probability β, the data reproduction process is not executed.

If the comparison result with the random number at Step S304 judges that the data reproduction process request is executed, Step S305 follows whereat executed are a process of extracting the processed data stored in storage means of the apparatus (node) and a process of generating a packet (refer to FIG. 13) having the extracted data as its payload and transmitting it to the reproduction instruction apparatus. On the other hand, if the comparison result with the random number judges that the data reproduction process request is not executed, Step S306 follows whereat the process is terminated without executing the data reproduction process.

As described above, the information processing apparatus received the data reproduction process request (command) autonomously judges, from the comparison between the random number and the record rule judgment condition statement stored in the packet, whether the command is executed or not, and executes the process in accordance with this judgment.

Figure 18:
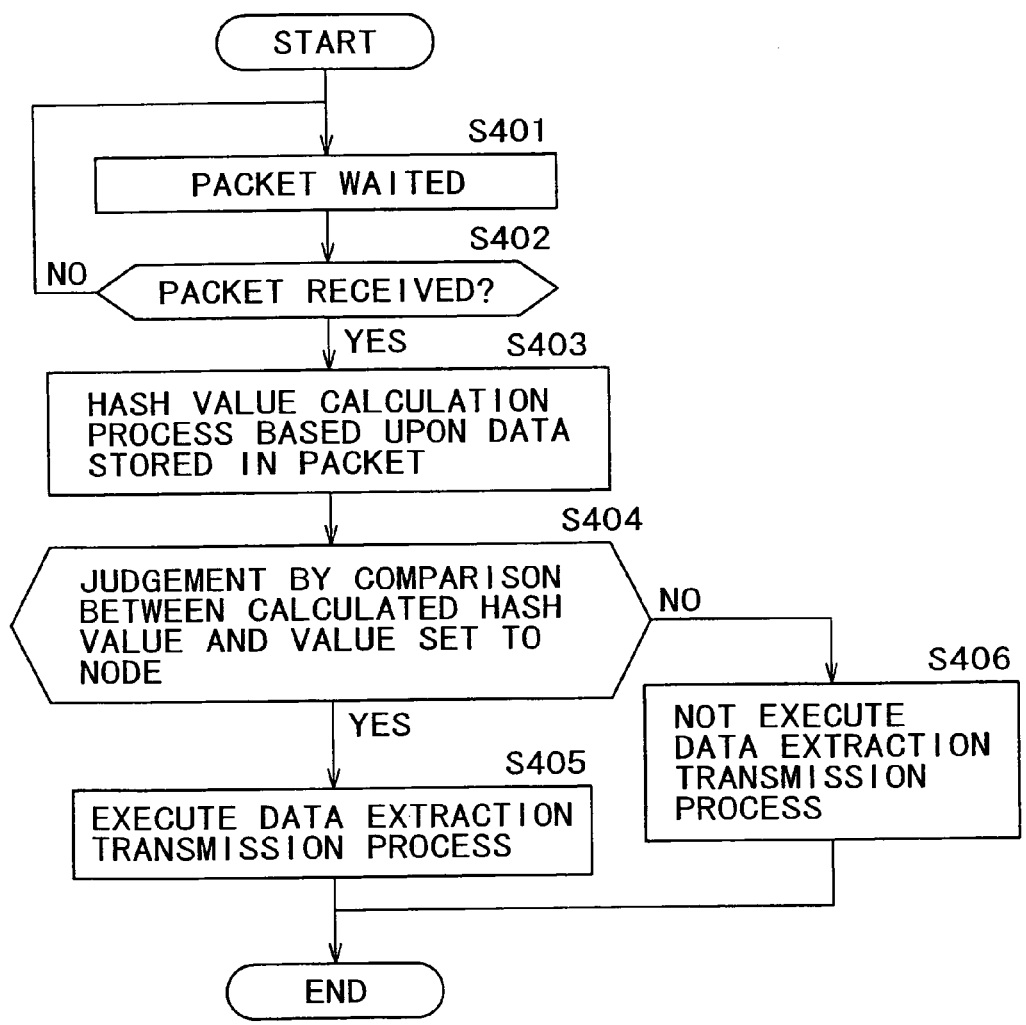
FIG. 18 is a flow chart illustrating a procedure including an autonomous process execution judgment process to be executed at a node that received a data reproduction process request packet from a reproduction instruction apparatus.

Next, with reference to the process flow shown in FIG. 18, description will be made on a process of calculating a hash value and autonomously judging from the hash value whether the data reproduction process request is executed or not, on the side of the information processing apparatus received the data reproduction process request.

First, at Step S401 the data reproduction request packet is waited for. If it is judged at Step S402 that the packet is received, at Step S403 a hash value generating process is executed based upon the data stored in the received packet. At Step S404 it is judged from the generated hash value whether the command is executed or not.

For example, the information processing apparatus stores as a set value a preset threshold value in the storage unit, and if the generated hash value>the set value, the command is executed, whereas if the generated hash value≦the set value, the command is not executed.

Similar to the judgment of the data record request process, the data to be used for generating the hash value may be, as shown in FIG. 10, an identifier (data ID) of the contents data or a portion of data, e.g., data of a predetermined X bits from the data start. For example, MD5 may be used for calculating the hash value. As shown in FIG. 10, the hash value of MD5 of the data ID or the hash value of MD5 of the data contents may be used.

If the judgment result based on the hash value at Step S404 indicates that the data record process request is executed, Step S405 follows whereat executed are a process of extracting the processed data stored in the storage means of the apparatus (node) and a process of generating a packet (refer to FIG. 13) having the extracted data as its payload and transmitting it to the reproduction instruction apparatus. On the other hand, if the comparison result with the hash value judges that the data reproduction process request is not executed, Step S406 follows whereat the process is terminated without executing the data reproduction process.

As described above, the information processing apparatus received the data reproduction process request (command) autonomously judges, from the comparison between the set value at the node and the hash value stored in the packet, whether the command is executed or not, and executes the process in accordance with this judgment.

5. Data Record Reproduction Process Sequence

Next, with reference to FIG. 19, description will be made collectively on a series of process sequences including issuance of the data record process request from the record instruction apparatus to a node, a data record process at a node, issuance of the data reproduction process request from the reproduction instruction apparatus to a node, data extraction at a node, and the packet transmission process.

First, at Step S11 the record instruction apparatus processes the record object data (contents), i.e., executes the FEC process and interleaving process. This processing is the processing previously described with reference to FIG. 5.

Next, at Step S12 the record instruction apparatus executes a data record process request (command) packet generating process. The packet is generated which stores the data subjected to the interleave process in its payload and is set with the probability: a as the "rule judgment condition statement" determined by the rule judgment condition setting unit 253 (refer to FIG. 4).

Next, at Step S13 the record instruction apparatus transmits the packet to each node constituting the distributed storage system by setting the address or addresses corresponding to the transmission node or nodes, i.e., by using unicast or multicast.

The process at the node received the data record process request (command) packet from the record instruction apparatus is the process executed by autonomous judgment of whether the process is executed or not, already described with reference to FIGS. 8 and 9. Although the processes at two nodes (nodes 1 and 2) are illustrated in FIG. 19, there are a number of other nodes executing the data record process and not executing the data record process, after the execution of autonomous judgment (probability control).

The two nodes (nodes 1 and 2) shown in FIG. 19 execute the probability control process at Steps S21 and S31, i.e., random number generation and a process executing/not-executing judgment process based upon the comparison with the probability: a set as the record rule judgment statement in the reception packet (data record process request packet), as described with reference to FIG. 8, or a process executing/not-executing judgment process based upon the comparison between the hash value based upon the data in the packet and the set value at the node, as described with reference to FIG. 9.

Figure 19:
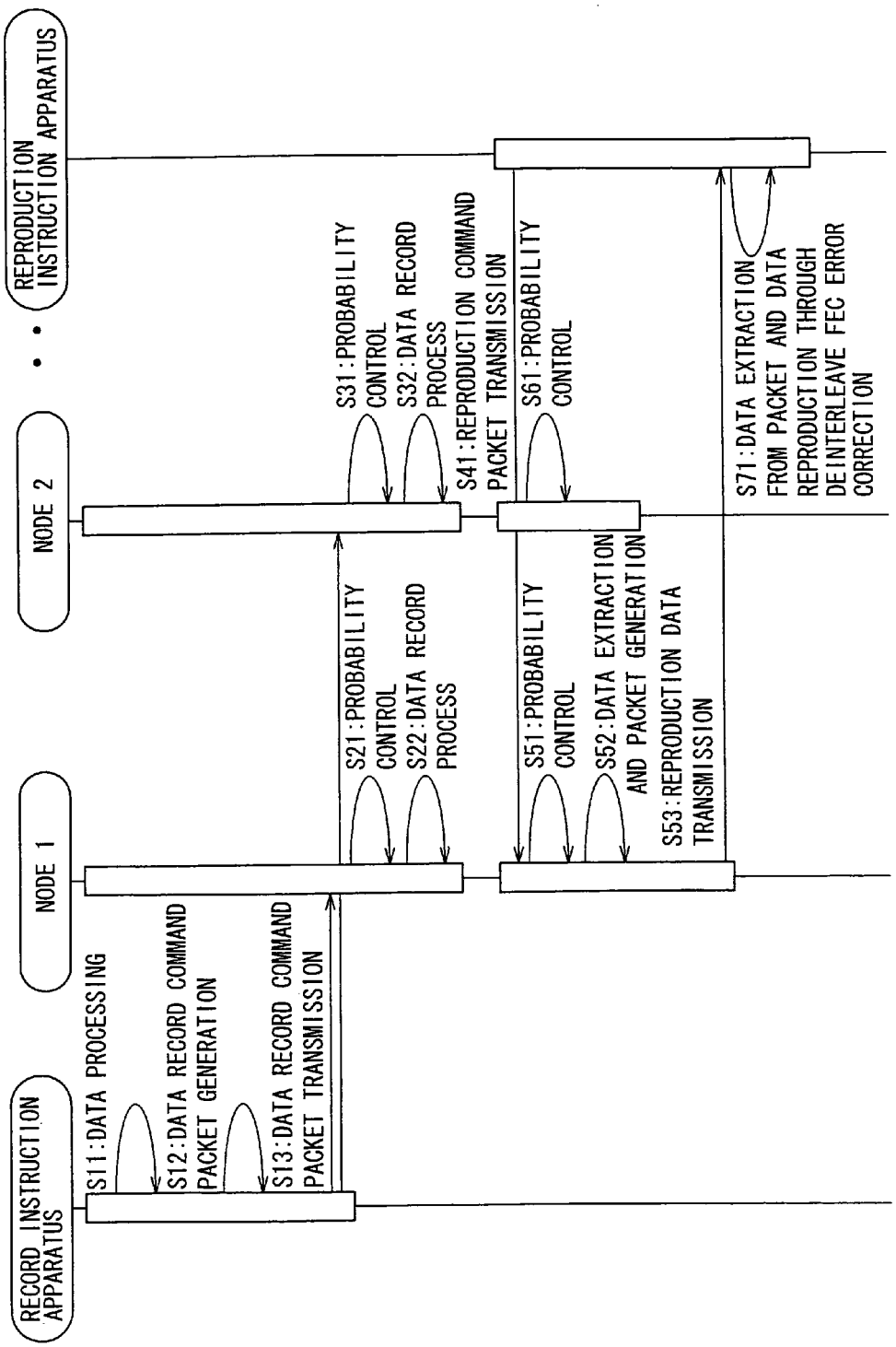
FIG. 19 is a sequence diagram explaining a data record process request from a record instruction apparatus, a data record process request at a node, a data reproduction request from a reproduction instruction apparatus, a data extraction transmission process at a node, and a reproduction process at a reproduction instruction apparatus.

The two nodes (nodes 1 and 2) shown in FIG. 19 obtain as the result of the probability control process at Steps S21 and 31 the conclusion that both execute the data record process, and execute the data record process at Steps S22 and S32. The record object data is the processed data subjected to FEC and interleaving and stored in the data record process request packet received from the record instruction apparatus.

Next, at Step S41 the reproduction instruction apparatus transmits the reproduction process request (command) packet (refer to FIG. 12) to each node. This packet stores an ID of the contents to be reproduced and the like as the request statement and is set with the reproduction judgment condition statement (probability: β).

Each node, i.e., each of the two nodes (nodes 1 and 2) shown in FIG. 19 received the reproduction process request (command) (refer to FIG. 12) executes a probability control process at Steps S51 and S61, i.e., random number generation and a process executing/not-executing judgment process based upon the comparison with the probability: β set as the reproduction rule judgment statement in the reception packet (data reproduction process request packet), as described with reference to FIG. 17, or a process executing/not-executing judgment process based upon the comparison between the hash value based upon the data in the packet and the set value at the node, as described with reference to FIG. 18.

The node 1 shown in FIG. 19 obtains as the result of the probability control process at Step S51 the conclusion that the node executes the data reproduction process, acquires corresponding data from the storage unit of the node in accordance with the request statement in the reproduction process request (command) packet and generates a packet (refer to FIG. 13) storing the acquired data in the payload at Step S52, and transmits the packet to the reproduction instruction apparatus at Step S53.

The node 2 shown in FIG. 19 obtains as the result of the probability control process at Step S61 the conclusion that the node does not execute the data reproduction process, and terminates the process without performing data extraction and packet generation and transmission.

In the configuration shown in FIG. 19, although only the node 1 transmits the data to the reproduction instruction apparatus, a number of unrepresented nodes 3 to n transmit the packets storing data to the reproduction instruction apparatus which receives a number of packets from a number of nodes.

At Step S71 the reproduction instruction apparatus received the packet storing the reproduction data deinterleaves the received data blocks to arrange the data order and FEC-decodes the deinterleaved data to recover the original data.

The data recovery process based upon the FEC and deinterleave process is the same as that previously described with reference to FIG. 14. Even if there are lost packets, errors are not the burst errors whose error portion has a large data area but the random errors, so that the original data can be recovered by the FEC decoding process.

As described above, the information processing apparatus received the data record or reproduction process request (command) can autonomously judge, from the record rule judgment condition statement or reproduction judgment condition statement set to each process request packet, whether the command is executed or not and perform the process in accordance with the judgment.

As described so far, the distributed storage system of the present embodiment transmits the packet written with the record probability α to each node constituting the system to thereby distributively record data. The data is acquired by making each node return the data at the return probability B. Since the data is distributively recorded, the data can be stored without concentrating the data management load upon one server. Since one data is shared at a plurality of nodes, the data capacity necessary for the whole system can be made small.

If data is received from a plurality of nodes, traffics are not concentrated upon one server so that data transmission and reception are possible with a stable communication amount.

By changing the values of α, β and q/p, the transmission efficiency and the amount of record data can be changed. By changing the values of parameters α, β and q/p by taking into consideration the loss probability α at the time of data record, data output or data transmission, it is possible to obtain data sufficient for recovery even if packets are lost.

In this distributed storage system, since data distributed record and read can be executed based upon the calculations of the record probability and return probability, the data management is simple and even household appliances having a small processing ability such as a camcorder and a portable phone can adopt this system. Since household appliances having a small processing ability such as a camcorder and a portable phone can be used as nodes, a distributed storage system of the scale of several million nodes can be easily configured.

In the above-described distributed storage system, although the record instruction apparatus transmits the record data and record probability by using the same packet, the record data and record probability may be transmitted by using different packets, or they may be recorded in an external recording apparatus to allow each information processing node to refer to them.

In the above-described embodiment, although the description has been centered around the example of the configuration that a packet transfer process is executed by the information processing apparatus connected to the network, the present invention is not limited to the configuration having the packet transfer configuration. For example, also in the communications between wireless communication apparatuses or in the communications between devices constituting electronic circuits of an information processing apparatus such as a PC, transfer data is set with the data corresponding to the above-described process rule judgment condition statement so that the wireless communication apparatus or device received the process request data can autonomously judge whether the request process is executed or not.

6. Data Transmission Process by Optimum Combination of Transmission Modes

Next, description will be made on the data transmission process using an optimum combination of transmission modes. In the configuration previously described with reference to FIG. 1 that a number of nodes are connected to the network and each node responds to the process request from the data record instruction apparatus or reproduction instruction apparatus and transmits the processed data, for example, if the data reproduction process is to be executed and the reproduction instruction apparatus can acquire necessary reproduction data by using various modes such as a data acquisition mode of acquiring data from a plurality of nodes and the carousel transmission described in the column of Prior Art. In the following, description will be made on efficient data transmission properly adopting a combination of these various data transmission modes.

For example, there are following data transmission modes. The carousel transmission mode of repetitively transmitting data from a single node, a chaining mode of accessing the node received data immediately before and receiving the data, a mode of receiving data from a plurality of distributed nodes and acquiring data from the collected data, a server client mode of accessing the node storing all data, e.g., the record instruction apparatus, and acquiring all data, and a local cache mode of locally storing necessary data in the own node and acquiring data from the local cache without involving data transfer during reproduction. These modes can be adopted as the reproduction data acquisition method.

In the configuration of the embodiment described below, when a data (contents) reproduction process is performed, a proper combination of the above-described various modes is executed so that network traffics are reduced and efficient and reliable data reproduction is realized.

Figure 20:
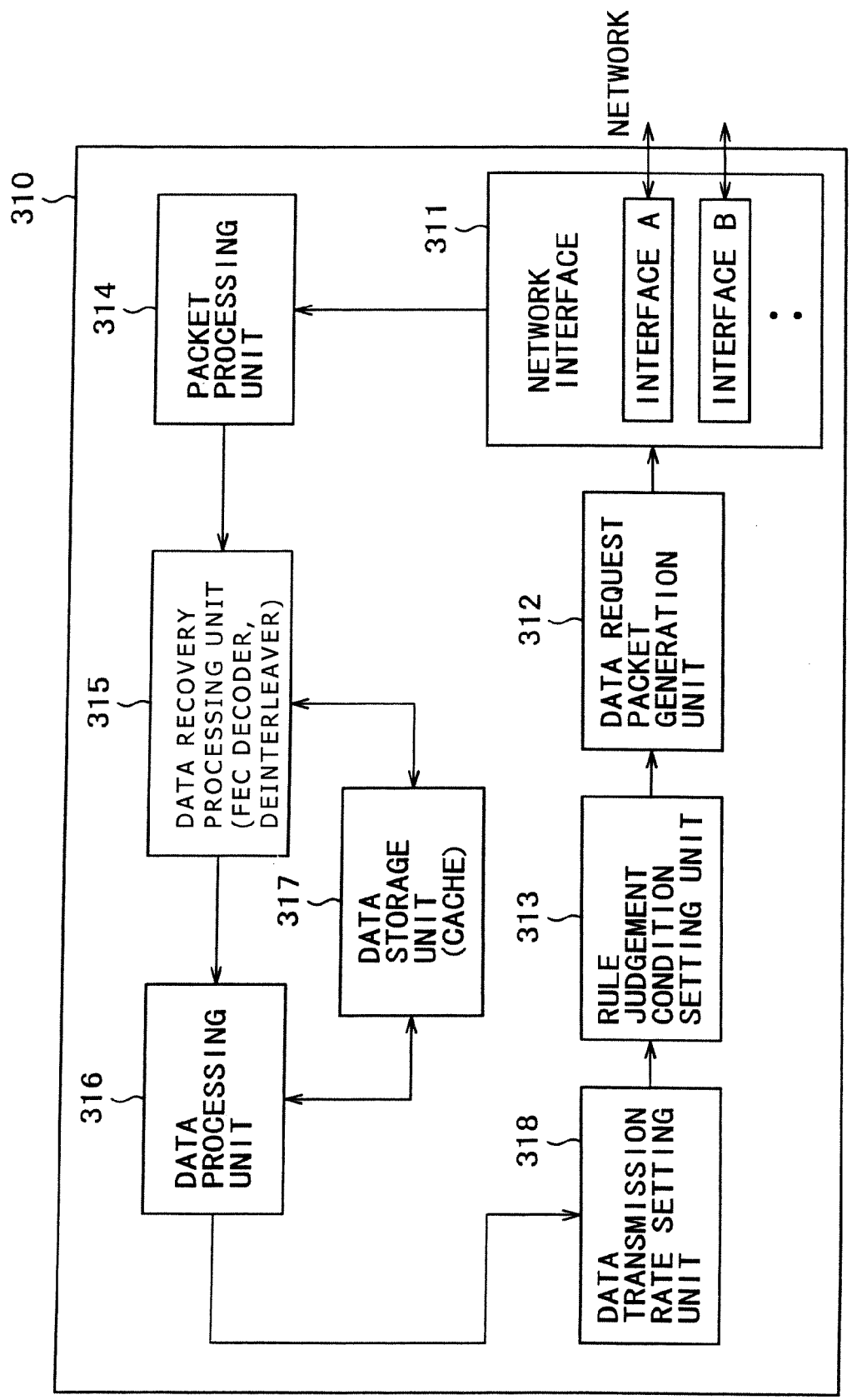
FIG. 20 is a diagram showing an example of a structure of a reproduction instruction apparatus.

With reference to FIG. 20, the structure of a reproduction instruction apparatus of the present embodiment will be described. If data necessary for reproduction is acquired from other nodes, the reproduction instruction apparatus transmits the data reproduction command to each node, receives reproduction object data from each node, and executes the data reproduction process. If data exists in the own cache (local cache), data is acquired from the cache and reproduced.

With reference to FIG. 20, the reproduction instruction apparatus 310 will be described. The reproduction instruction apparatus 310 has a network interface 311 for transmitting and receiving data to and from an external apparatus via a network, a data request packet generating unit 312 for generating a packet requesting a node to transmit reproduction data and designating the reproduction object data, and a rule judgment condition setting unit 313 for determining the probability value: B as the "rule judgment condition statement" to be set to the data request packet.

The reproduction instruction apparatus has also a data transmission rate setting unit 318 for selecting one or more data transmission modes from a plurality of data transmission modes and determining the data transmission rate of each of the selected modes. In accordance with the data transmission rate determined by the data transmission rate setting unit 318, the data request packet generating unit 312 sets the reproduction request process object data and executes a packet address setting process to generate the data reproduction process request packet storing the designation data for the reproduction request process object data as the request statement.

The data transmission rate setting unit 318 selects the data transmission modes and the data transmission rate of each selected mode, in accordance with the demand level of the reproduction object data. The data transmission rate setting unit selects at least either the carousel transmission mode, chaining transmission mode, distributed cache mode or client server mode, and determines the data transmission rate of each selected mode.

The network interface 311 receives the packet storing the reproduction data from each node, and a packet processing unit 314 of the reproduction instruction apparatus 310 executes a process of coupling data divided into the packets. A data recovery processing unit 315 executes the deinterleave process and FEC decoding process for the data extracted from the received packets to thereby recover the data. The recovered data is input to a data processing unit 316 and output to an external machine such as a monitor and a speaker (omitted in the drawing) or stored in an unrepresented recording apparatus. A data storage unit 317 is used as a local cache and can store reproduction object data. If the stored data is processed data, this data is subjected to the recovery process by the data recovery processing unit 315 to reproduce data. If the stored data is data still not processed, this data is reproduced by the data processing unit 316 without involving the recovery process.

The data request packet generating unit 312 transmits the data request packet to each node constituting the distributed storage system. The structure of the packet to be transmitted is the same as that previously described with reference to FIG. 12, and is constituted of a header, a reproduction rule judgment condition statement field, a request field and a footer. A data ID for identifying the requested data is recorded in the request statement field. Control information is recorded in the header and footer, the control information including a check sum of CRC, a network address and GUID of a node, a sequence number indicating a data order and the like.

The return probability β determined by the rule judgment condition setting unit 313 is set to the reproduction rule judgment condition statement field. The return probability is a variable used for judging whether the node received the packet returns data is returned. It is judged from this variable whether the requested data is extracted from the own storage unit and whether data is returned by generating a packet.

There are a node judged from this variable that data is returned and a node judged from this variable that data is not returned. The return probability β is a value if the whole distributed storage system is viewed macroscopically. In the whole distributed storage system, the probability that each node returns data is β. Therefore, if there are n nodes in the distributed storage system, the percentage of returned packets is a value n×β, the number n of nodes multiplied by the return probability β.

In the present embodiment, various data transmission modes such as carousel, chaining, client server are used and the rule judgment condition setting unit 313 can set the return probability β in accordance with each transmission mode. Namely, βa is set to the carousel, βb is set to the chaining, βc is set to the client server, and so on. The return probability β may be set only to the data reception from the above-described distributed node, and the return probability is not set to other modes.

The packet processing unit 314 couples the packets returned from respective nodes. The return node has the structure previously described with reference to FIG. 13. As shown in FIG. 13, the packet is constituted of a header, a payload and a footer. The data extracted from the storage unit by each node, i.e., the block data subjected to the FEC process and interleave process previously described with reference to FIG. 5, is stored in the payload, and control information is stored in the header and footer, the control information including a check sum of CRC, a network address of a node on the reception side, a sequence number indicating a packet order and the like.

If the reproduction instruction apparatus receives the packet shown in FIG. 13, the packet processing unit 314 analyzes the packet, reads the sequence number, arranges the order of received packets, removes the control information of the header, footer and the like to couple the packets in the sequence number order.

The data recovery processing unit 315 deinterleaves the received block data to arrange the data order and FEC-decodes the deinterleaved data to recover the original data. The data recovery process using FEC and deinterleave process is the same as that previously described with reference to FIG. 14.

The data recovered by the data recovery processing unit 315 is output to the data processing unit 316. The data processing unit 316 stores the recovered data in an unrepresented recording unit or outputs the recovered data to an output unit such as a monitor and a speaker via an output interface.

As described above, the reproduction instruction apparatus of the present embodiment has an interface 311 having a plurality of interfaces (A, B, . . . ) to deal with a plurality of transmission modes. Via each of these interfaces, the rule judgment condition setting unit 313 transmits the reproduction process request (command) set with the return probability (βa, βb . . . ) determined in accordance with the transmission mode.

Figure 21:
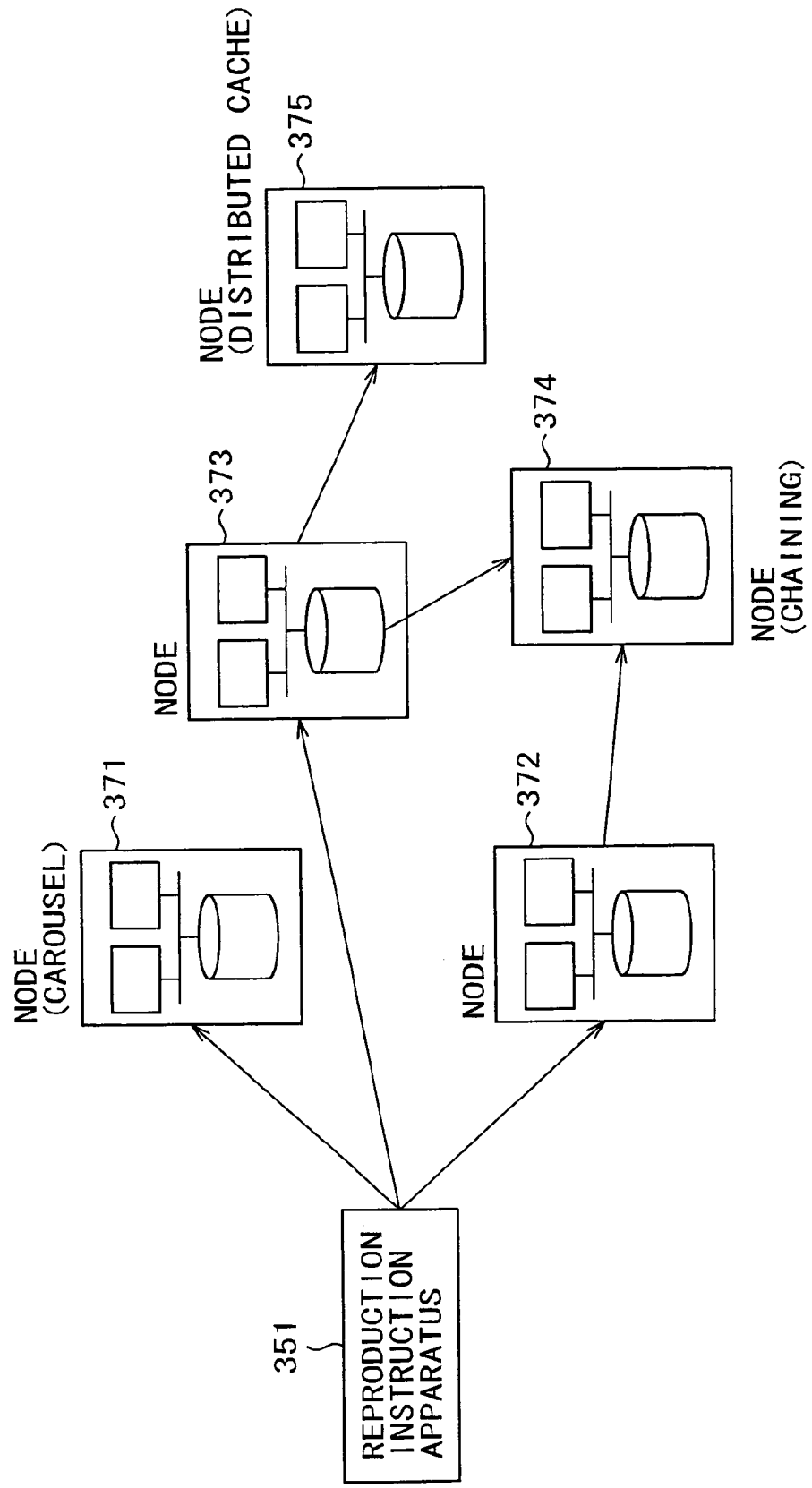
FIG. 21 is a diagram explaining a process of transmitting a reproduction process request (command) packet to each network-connected node.

FIG. 21 is a diagram explaining a process of transmitting the reproduction process request (command) to each node connected to the network. Each node provides one or a plurality of transmission modes. Although only some nodes are drawn in this drawing, a number of nodes are distributed on the network, providing the modes such as carousel, distributed cache, chaining and client server.

The reproduction instruction apparatus 351 generates the data reproduction process request packet and distributes it to each node by unicast or multicast. For example, the nodes include a node 371 for executing the carousel transmission, a node 374 for executing the chaining transmission, a node 375 for storing data by the distributed cache mode and other nodes 372 and 373. The data reproduction process request packet is set with the return probability (βa, βb . . . ) corresponding to each transmission mode as the reproduction rule judgment condition statement previously described with reference to FIG. 12 and with an identifier of the reproduction designated data, e.g., the contents ID, GUID or the like as the request statement.

Figure 22:
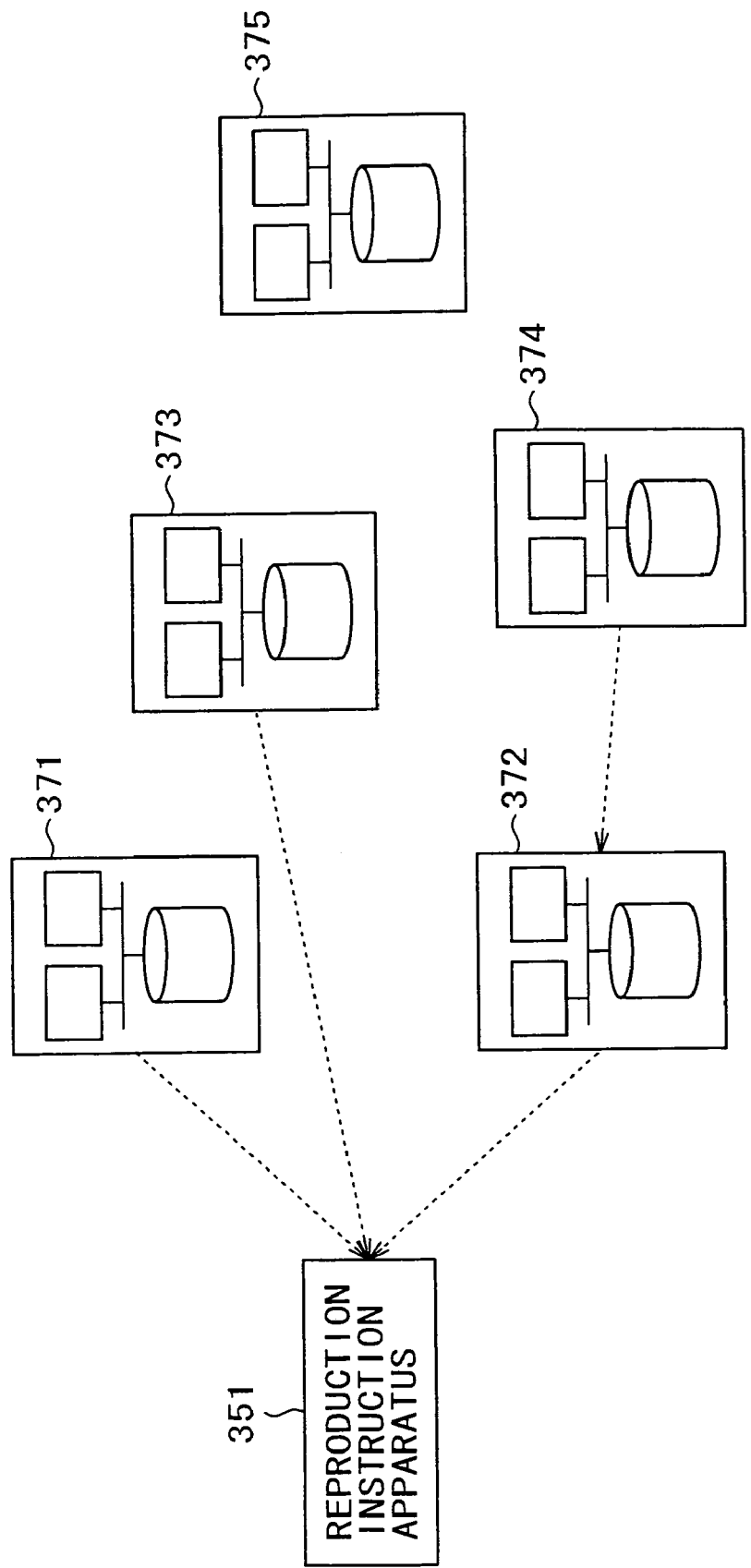
FIG. 22 is a diagram showing a state such that each node transmits data to a reproduction instruction apparatus as a response to a reproduction process request (command) packet.

FIG. 22 shows the state that respective nodes 371 to 375 transmit data to the reproduction instruction apparatus 351 as a response to the reproduction process request (command). In accordance with the reproduction command, the node received the data reproduction process request packet shown in FIG. 12 performs the data reproduction process. Namely, the node reads the designated data from the storage unit of the node and autonomously judges whether the packet is generated and transmitted. Only the node judged to execute the process generates a packet (refer to FIG. 13) and transmits it to the reproduction instruction apparatus 351, the packet storing the reproduction data and having as the payload the processed data subjected to the FEC process and interleave process described with FIG. 6. Each node returns the data by its corresponding mode such as carousel, distributed cache, chaining and client server.

With reference to FIG. 23, description will be made on the details of the method of acquiring data necessary for reproduction by the reproduction instruction apparatus and the characteristics of each mode. FIG. 23 summarizes the characteristics of each transmission mode or storage mode of data to be acquired, such as reproduction object data. The modes are classified into the carousel mode, distributed cache mode, chaining mode, local cache mode and client server mode. The distributed cache mode is further classified depending upon whether the cache node is at a near distance or far distance from the apparatus executing a data acquisition process such as the reproduction instruction apparatus.

The carousel is the data transmission mode of repetitively multicast-transmitting a group of some data. If data sent by the carousel mode is multicast-transmitted, only reading a certain address is permitted and an amount of received data per unit time cannot be changed. Therefore, if data having a length of 100 is repetitively transmitted at a speed of a unit time of 100 and if the data was subjected to a random arrangement process by the above-described interleave process, a probability of receiving effective data per unit time is 10%.

However, in the case of streaming data distribution for example, data other than the effective data received in the unit time can be used always as relevant data in the future, i.e., the data becomes a data portion applicable to the deinterleave process. Therefore, if these data are cached in the storage unit of the own apparatus and the cached data is used without newly receiving the data, the band can be narrowed. This band narrowing effect is illustrated in FIG. 24. Since the amount of locally cached data increases with time, the amount of packets to be received by the mode other than the carousel gradually reduces. Namely, if all the data is not received by the carousel transmission but some data is carousel-transmitted, the band narrowing effect occurs.

Next, the distributed cache through probability distribution will be described. In this mode, the record process request packet set with the record rule judgment condition statement described with reference to FIG. 6 is transmitted to each node, and data recorded at the node executing the autonomous process judgment is acquired by the reproduction instruction apparatus by transmitting the reproduction request packet. As compared to other modes, this transmission mode is capable of the most flexible operation. For example, respective nodes are classified into groups and if a near node group with a smaller load on the network can be obtained, it becomes possible to control in such a manner that the reproduction packet is received from the group as near as possible.

For example, a transmission loss of packets can be minimized by performing a process of setting addresses (multicast addresses) to a node group near the reproduction instruction apparatus to which the data reproduction process request is transmitted. By using an address table such as shown in FIG. 25, the traffics of the network can be controlled by setting multicast addresses which are limited only to the nodes at a near distance from the reproduction instruction apparatus to which the data reproduction request is transmitted, or by setting multicast addresses which are limited only to the nodes at a middle distance or far distance from the reproduction instruction apparatus, or to all nodes.

Next, the chaining transmission mode will be described. In the chaining mode, if a node also operates as the reproduction instruction apparatus, data reproduced immediately before or in the past is cached and used again.

For example, as shown in FIG. 26, an address table is formed having identifier information of data reproduced immediately before or in the past and identification information of nodes transmitted data and showing a correspondence between data (contents) IDs and a unicast address or multicast addresses including the address corresponding to the node transmitted the data. By referring to this table, the setting address of the data reproduction request (command) to be transmitted by the reproduction instruction apparatus is determined.

Although the chaining is an effective mode, for example, for the contents (data) rapidly gained the popularity, if the number of nodes storing data is small, data may be required to be sent from a far distance and a transmission loss such as duplicated packets is large. It is therefore desired to use this mode only in the state that the contents data is stored in a number of nodes, i.e., only before the distributed cache state.

It is also possible to use the local cache mode without real time transmission during data reproduction. Namely, in this mode, data is stored in the local cache of the own apparatus executing the reproduction process and the stored data is used for the reproduction process. However, it is considered that this mode corresponds to the case wherein the cache capacity of each node executing the distributed cache process is very large and data is one-sided to particular data.

The client server transmission mode is applicable to data transmission for the data unable to be acquired by other modes such as carousel, distributed cache, chaining and local cache. With this mode, the data is acquired by inquiring the apparatus storing original data, i.e., a server storing data by all means such as the record instruction apparatus. Data transmission by the client server mode is a data distribution process configuration suitable for data requested by only a very few reproduction instruction apparatuses such as data hardly cached at other nodes. Even data having a small data use frequency can be reliably acquired.

FIG. 23 summarizes the characteristics of each of the above-described modes. The characteristics include six items, a distance, a net load, a data detection probability, an on-demand aptitude, a transmission loss, an efficient demand. The distance is a distance between the reproduction instruction apparatus and a node storing data on the network. Although the distributed cache mode can be classified into groups, a far distance group and a near distance group, the other modes cannot be classified into groups so that these modes are classified into "far". The network load is evaluated by the transmission distance multiplied by the transmission packet amount. The small network load is represented by "small" and the large network load is represented by "large". Only the carousel mode can reduce the network load even if the distance is far, and the other modes have a large network load as the distance becomes longer. The local cache has a large load if data is downloaded in advance.

The data detection probability indicates whether the possibility that certain data requested by the reproduction instruction apparatus is transmitted via its transmission path is large or small. The on-demand aptitude indicates whether the reproduction of certain data requested by the reproduction instruction apparatus can be started immediately. The transmission loss is a loss of data transmission including duplicated packets, and "large" is undesirable. In summary of the above, data demands and suitable transmission modes can be classified. This is indicated by the item "efficient demand".

Such different transmission modes having various characteristics are seamlessly integrated based upon probablistic rules, and data transfer control is performed in accordance with data demand (popularity level) for one node (information processing apparatus) to several tens of million nodes connected to the network.

With reference to FIG. 27, description will be made on the data transfer control in accordance with data demand (popularity level). In FIG. 27, the ordinate is a logarithmic axis and represents the data demand (popularity level) and the abscissa represents a rate (band rate) of adopting each data acquisition mode. The band rate corresponds to the data transmission rate of each data transmission mode.

For example, for the data (contents) in the area above a having a very high demand level (popularity level), the carousel transmission is executed 100%. For the data (contents) at a point b of the demand level (popularity level), the band rate of adopting the carousel transmission is 30% and the band rate of adopting data acquisition by the distributed cache is 70%. Namely, 30% of the contents data at the high popularity level (point b) is acquired by the carousel transmission and the remaining 70% of the data is acquired by the distributed cache.

For the data (contents) at a point c of the demand level (popularity level), the band rate of adopting data acquisition by the distributed cache is 43%, and the data transfer by the chaining and client server is 57%. For the data (contents) having the low demand level (popularity level) at a point d or lower, data transfer is performed all by the client server.

The data transmission rate setting unit 318 (refer to FIG. 20) has the correspondence data such as shown in FIG. 27 between the demand level of the reproduction object data and the band rate as the data transmission rate of the adopted data transmission mode, and in accordance with the correspondence data, executes the process of selecting the data transmission mode in accordance with the demand level information of the reproduction object data and determining the data transmission rate of each selected mode.

In accordance with the data transmission rate determined by the data transmission rate setting unit 318, the data request packet generating unit 312 sets the reproduction request process object data and executes the address setting process to generate the data reproduction process request packet storing the designated data of the reproduction request process object data as the request statement. For example, for the data (contents) having the point c of the demand level (popularity level), since the data acquisition rate by the distributed cache is 43% and the data transfer by the chaining and client server is 57%, a data acquisition request of 43% of all the contents is written as the request statement of the data acquisition request packet, and the multicast addresses corresponding to the distributed nodes are set as the addresses.

The data request for the remaining 57% data is executed by the data request of the client server mode. Namely, the address of the server (e.g., record instruction apparatus) is set and the packet storing the 57% data request as the request statement is transmitted to the server.

By selectively using the transmission mode in the above manner, efficient data transfer can be realized. The transmission process only by the carousel is performed for the contents having the data acquisition requests from a number of nodes connected to the network, e.g., from several hundreds of thousand. As the demand reduces, "carousel+distributed", "distributed+chaining+client server" are performed, and for the data having a smaller demand, "only client server" is performed. In this manner, the mode adopted to data acquisition is switched in accordance with the demand level (popularity level).

The present embodiment proposes that such policy is represented by the demand level (popularity level) of data. In FIG. 27, although the four types, "carousel+distributed", "distributed+chaining+client server" and "only client server" are distinguishably used in accordance with the data demand level (popularity level), the data transmission combination and order combination are not limited only to those shown in the drawing, but various settings are possible. Other transmission modes may be added. Although the structure shown in FIG. 27 does not contain the process by the local cache, if there is local cache data, it can be structured so that the use band rate is reduced by an amount corresponding to the data capable of being acquired from the local cache.

As described above, the present embodiment has the configuration that the data transmission mode and acquisition method are changed with the demand level (popularity level) of data to be acquired. It is preferable that index data of the demand level (popularity level) of data to be acquired is set to, for example, a web site capable of being freely browsed or the like and that the node as the reproduction instruction apparatus acquires the latest demand level information and executes the reproduction request in accordance with the acquired information. The process may be performed based upon specific information or presumed information possessed by the node itself as the reproduction instruction apparatus.

FIG. 28 shows an example of a demand information provider apparatus 421 for providing demand level information, installed on a network. The demand information provider apparatus 421 collects and stores the number of nodes connected to the network, transmission mode information executable at each node, and the demand information of data (each of contents), and supplies these information in response to a request from the reproduction instruction apparatus 411. In FIG. 28, although the reproduction instruction apparatus 411 is shown distinguishable from other nodes 431 to 435, any of the nodes 431 to 435 may function as the reproduction instruction apparatus.

The demand information provider apparatus 421 may be structured so that not only it provides the number of nodes connected to the network, information on the transmission mode executable at each node, demand information of data (contents), but also it performs the timing control of a carousel transmission start. Namely, if the carousel transmission starts from the node having original data, the demand information provider apparatus 421 transmits a transmission start request and the carousel transmission starts under the condition that the node receives the transmission start timing. The node executing the carousel transmission is, for example, the record instruction apparatus having the original data, the node storing data in the own storage means, and the like. The number of nodes executing the carousel transmission may be only one node or a plurality of nodes.

The demand information provider apparatus 421 is constituted of an information processing apparatus having a communication unit for executing data transmission and reception to and from a network-connected node and a control unit for generating demand information and controlling a generated information providing process.

The control unit executes, for example, a process of counting the number of demand level information acquisition requests received from a network-connected node via the communication unit, and in accordance with the count information, generates the demand level information of each data. Upon reception of the demand level information request from the network-connected node via the communication unit, the control unit generates response information corresponding to the count value and transmits it.

If the demand level of the data corresponding to the count information becomes equal to or larger than a preset threshold value, the control unit of the demand information provider apparatus 421 controls the transmission of a carousel transmission process request for the data corresponding to the demand level equal to or larger than the threshold value, relative to the carousel transmission execution node. These processes will be later described.

Next, with reference to FIG. 29, description will be made collectively on a series of process sequences including issuance of the data record process request from the record instruction apparatus to a node, a data record process at a node, an inquiry from the reproduction instruction apparatus to the demand information provider apparatus and response information reception, issuance of the data reproduction process request to a node in accordance with the response information, data extraction at a node, and the packet transmission process.

First, at Step S501 the record instruction apparatus processes the record object data (contents), i.e., executes the FEC process and interleaving process. This processing is the processing previously described with reference to FIG. 5.

Next, at Step S502 the record instruction apparatus executes a data record process request (command) packet generating process. The packet is generated which stores the data subjected to the interleave process as its payload and is set with the probability: a as the "rule judgment condition statement" determined by the rule judgment condition setting unit 253 (refer to FIG. 4).

Next, at Step S503 the record instruction apparatus transmits the packet to each node constituting the distributed storage system by setting the address or addresses corresponding to the transmission node or nodes, i.e., by using unicast or multicast.

The process at the node received the data record process request (command) packet from the record instruction apparatus is the process determined by autonomous judgment of whether the process is executed or not, already described with reference to FIGS. 8 and 9. Although the processes at two nodes (nodes 1 and 2) are illustrated in FIG. 29, there are a number of other nodes executing the data record process and not executing the data record process, after the execution of autonomous judgment (probability control).

The two nodes (nodes 1 and 2) shown in FIG. 29 execute the probability control process at Steps S511 and S521, i.e., random number generation and a process executing/not-executing judgment process based upon the comparison with the probability: α set as the record rule judgment statement in the reception packet (data record process request packet), as described with reference to FIG. 8, or a process executing/not-executing judgment process based upon the comparison between the hash value based upon the data in the packet and the set value at the node, as described with reference to FIG. 9.

Figure 29:
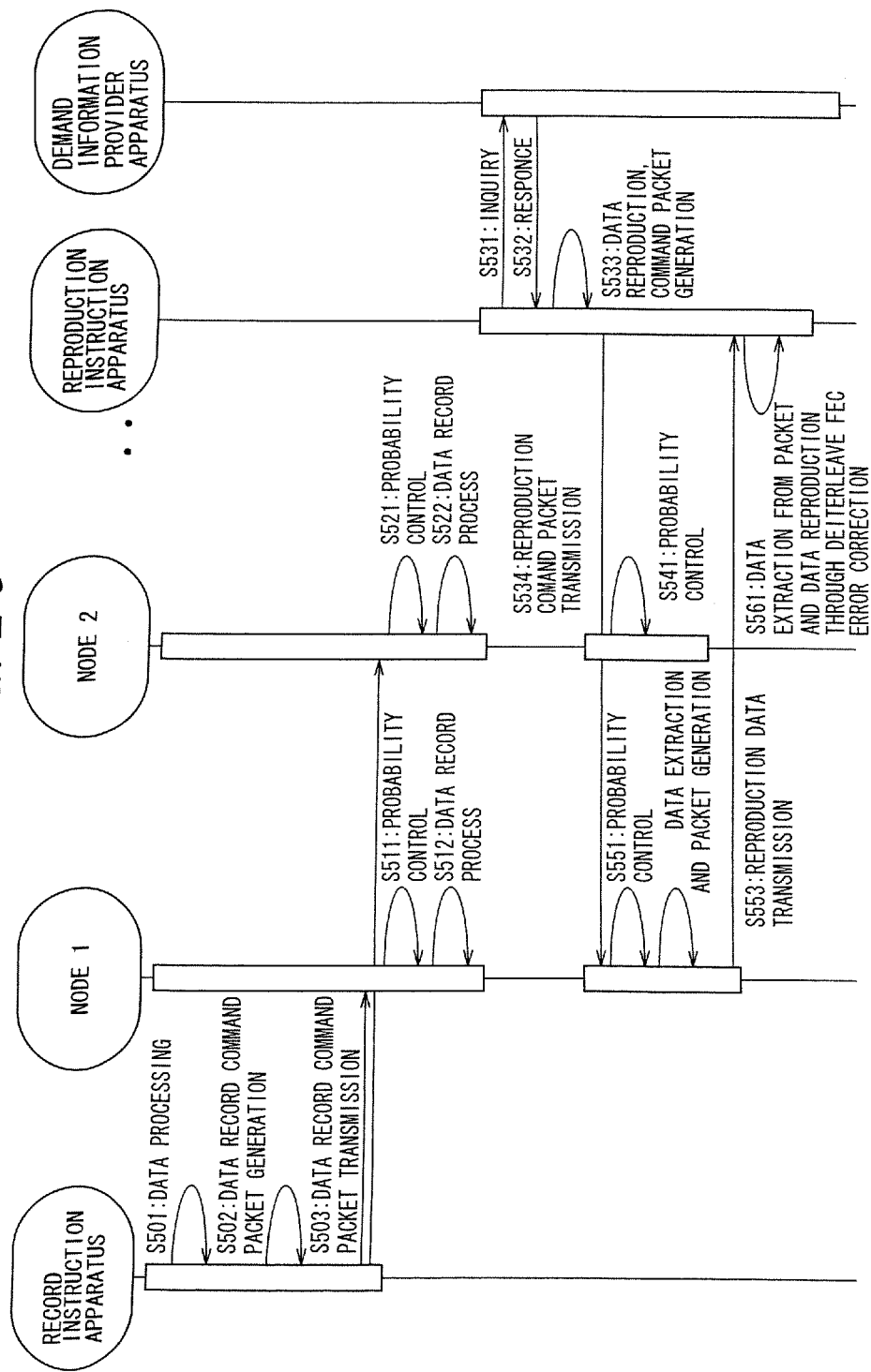
FIG. 29 is a diagram explaining issuance of a data record process request from a record instruction apparatus to a node, a data record process at a node, an inquiry from the reproduction instruction apparatus to a demand information provider apparatus and a response information reception, issuance of a data reproduction process request to a node in response to a response information, data extraction at a node, and a series of process sequences of a packet transmission process.

The two nodes (nodes 1 and 2) shown in FIG. 29 obtain as the result of the probability control process at Steps S511 and S521 the conclusion that both execute the data record process, and execute the data record process at Steps S512 and S522.

The record object data is the processed data subjected to FEC and interleaving and stored in the data record process request packet received from the record instruction apparatus.

Next, at Step S531 the reproduction instruction apparatus inquires the demand information provider apparatus, and acquires the demand information for the reproduction scheduled contents, and if necessary, further the information of the transmission mode executable at each node, from the response at Step S532.

In accordance with the information acquired from the demand information provider apparatus, the reproduction instruction apparatus determines the transmission mode of the reproduction data, and in accordance with the determined information, generates the reproduction process request (command) packet (refer to FIG. 12) at Step S533. At Step S534 the packet is transmitted to each node. The reproduction data transmission mode is, for example, any of the carousel, distributed cache, chaining+client, and client server modes. The packet is set with the address of the node being able to execute the determined transmission mode. The packet further stores an ID of the contents to be reproduced and the like as the request statement and is set with the reproduction judgment condition statement (probability: β), if necessary.

Each node, i.e., each of the two nodes (nodes 1 and 2) shown in FIG. 29 received the reproduction process request (command) (refer to FIG. 12) executes a probability control process at Steps S541 and S551, i.e., random number generation and a process executing/not-executing judgment process based upon the comparison with the probability: β set as the reproduction rule judgment statement in the reception packet (data reproduction process request packet), as described with reference to FIG. 17, or a process executing/not-executing judgment process based upon the comparison between the hash value based upon the data in the packet and the set value at the node, as described with reference to FIG. 18.

The node 1 shown in FIG. 29 obtains as the result of the probability control process at Step S551 the conclusion that the node executes the data reproduction process, acquires corresponding data from the storage unit of the node in accordance with the request statement in the reproduction process request (command) packet, generates a packet (refer to FIG. 13) storing the acquired data in the payload, and transmits the packet to the reproduction instruction apparatus at Step S553.

The node 2 shown in FIG. 29 obtains as the result of the probability control process at Step S541 the conclusion that the node does not execute the data reproduction process, and terminates the process without performing data extraction and packet generation and transmission.

In the configuration shown in FIG. 29, although only the node 1 transmits the data to the reproduction instruction apparatus, a number of unrepresented nodes 3 to n transmit the packets storing data to the reproduction instruction apparatus which receives a number of packets from a number of nodes.

At Step S561 the reproduction instruction apparatus received the packet storing the reproduction data deinterleaves the received data blocks to arrange the data order and FEC-decodes the deinterleaved data to recover the original data.

The data recovery process based upon the FEC and deinterleave process is the same as that previously described with reference to FIG. 14. Even if there are lost packets, errors are not the burst errors whose error portion has a large data area but the random errors, so that the original data can be recovered by the FEC decoding process.

Next, with reference to the flow chart shown in FIG. 30, description will be made on the detailed procedure from the "demand inquiry" to "recovery of processed data" at the reproduction instruction apparatus shown in the sequence chart of FIG. 29.

First, if the reproduction object contents are determined, at Step S601 the reproduction instruction apparatus inquires the demand information provider apparatus. For example, for this inquiry, a packet storing the contents identifier (contents ID) is generated and transmitted to the demand information provider apparatus.

Next, at Step S602 in accordance with the demand information received from the demand information provider apparatus, the reproduction instruction apparatus determines the reproduction data acquisition mode or data transmission mode. This mode is determined in accordance with the correspondence relation between the demand level and band rate already described with reference to FIG. 27. For example, as described earlier, for the data (contents) in an area higher than a where the demand level (popularity level) is extremely high, the carousel transmission is executed 100%. For the data (contents) at the point b of the demand level (popularity level), the band rate of adopting the carousel transmission is set to 30% and the band rate of adopting data acquisition from the distributed cache is set to 70%.

For each of the carousel, distributed cache, chaining+client and client server modes, a function representative of the relation between the contents demand and a rate of the probability of a transmission route may be set to determine the transmission mode from this function. A function group y=Dn(x) is set wherein x is the demand level (logarithmic axis) along the vertical axis shown in FIG. 27 and y is the band rate (%: lateral width) of each transmission route. For example, n is set for each mode: carousel: n=1, distributed cache: n=2, chaining+ client: n=3, client server: n=4 and the like.

In this function group y: y=Dn (x), Dn (x) is determined to satisfy ΣDn(x)=1 at an arbitrary x. In accordance with the demand information received from the demand information provider apparatus, the demand level: x corresponding to the vertical axis shown in FIG. 27 is acquired and set to the function group: y=Dn(x) to determine the bands: y for n=1 to 4, i.e., the bands for the carousel, distributed cache, chaining+ client, and client server.

Namely, the data transmission rate setting unit 318 (refer to FIG. 20) applies the function group: y=Dn(x) (where ΣDn (x)= 1) set by the demand level: x, the band rate: y of each transmission mode, and the identification value: n of each data transmission mode, and uses the demand level: x determined from the demand information to execute a data transmission rate determining process for each data transmission mode. Alternatively, selecting the transmission mode to be executed and setting the band rate may be performed in accordance with the correspondence data between the demand level and band rate shown in FIG. 27.

The function: Dn(x) is set so that as x becomes large, an effective transmission path is selected if the demand is high, to thereby allow the optimum transmission path to be selected. However, since there is the practical case that the node capable of using the transmission path does not have the data, if the insufficient data occurs, x is adjusted to increase the rate of transmission paths certainly having the data and optimize the transmission path, because in general the transmission path effective if the demand is low has a higher probability than the transmission path effective if the demand is high. This adjustment process corresponds to the process at Step S606, Step S609 and Step S603 in the flow shown in FIG. 30.

Figure 30:
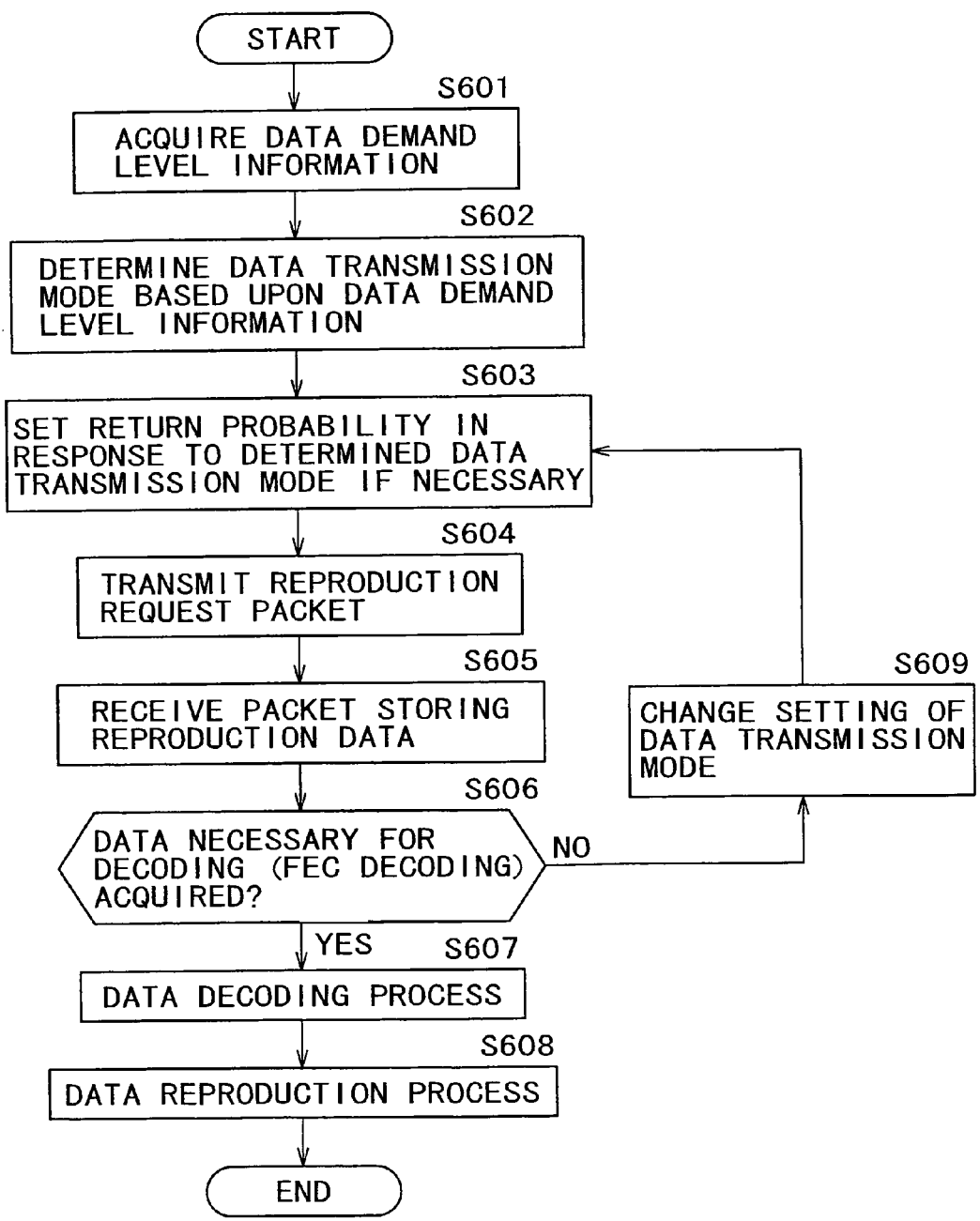
FIG. 30 is a flow chart illustrating a detailed procedure from "demand inquiry" to "processed data recovery" at a reproduction instruction apparatus.

Returning to the process flow shown in FIG. 30, the description will continue. After the transmission mode for the reproduction object data is determined based upon the demand level at Step S602, the return probability corresponding to the determined data transmission mode is set if necessary at Step S603. The return probability is, for example, the return probability: β as the reproduction rule judgment condition statement (refer to FIG. 12) set to the reproduction request packet if data is acquired from the distributed cache. In other transmission modes, the return probability: βn corresponding to each transmission mode is set if necessary.

Next, at Step S604 the reproduction packet (refer to FIG. 12) set with the reproduction rule judgment condition statement and using the identification information of the reproduction object data as the request statement is transmitted. At Step S605 a data packet (refer to FIG. 13) having the reproduction data as the payload is received. It is judged at Step S606 whether the data able to execute the decoding process (FEC decoding) is acquired. If acquired, the decoding process is executed at Step S607. For the decoding process, for example, executed is a process containing deinterleaving and FEC decoding previously described with reference to FIG. 14.

If the reproduction object data stored at the node is the encoded data at the encoding rate of q/p subjected to conversion from p blocks into q blocks by FEC encoding and the record probability: a designated by the record instruction apparatus connected to the network and the return probability: β are set, then the number of return blocks is q×α×n×β. If the number of return blocks: q×α×n×β>the number of blocks: p, the data can be recovered from the return data. It is judged at Step S606 whether the above-described condition is satisfied. If not satisfied, it may stand by to continue data reception, or as described above, the data transmission mode may be changed at Step S609 to again execute the process at Step S603 and following Steps.

If it is judged at Step S606 that the data allowing the decoding process (FEC decoding) to be executable is acquired, then the decoding process is executed at Step S607, and at Step S608 data reproduction is executed based upon the decoded data.

Figure 31:
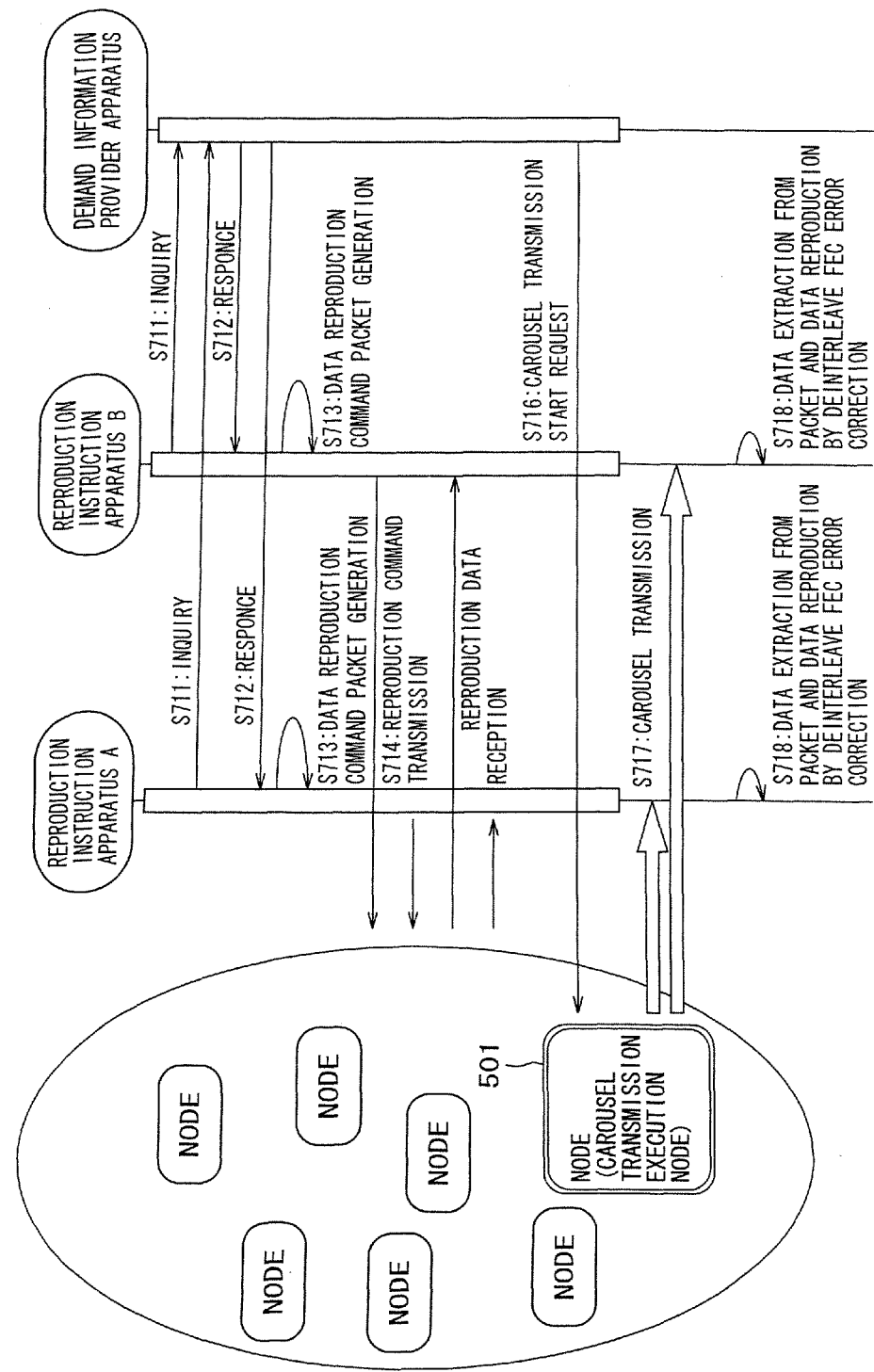
FIG. 31 is a diagram explaining a process sequence that a demand information provider apparatus detects an increase in contents demand and controls a carousel transmission in accordance with the detected information.

Next, with reference to FIG. 31, description will be made on the process sequence in which the demand information provider apparatus detects that the demand for the contents increases, and in accordance with this detection information, carousel transmission start is controlled.

The demand information provider apparatus measures the contents demand level, for example, by counting the number of demand level inquiries received from the reproduction instruction apparatus. The larger the number of demand level inquiries received from the reproduction instruction apparatus is, it is judged the data (contents) demand is correspondingly high. If the number of demand level inquiries received from the reproduction instruction apparatus exceeds a preset threshold value, the demand information provider apparatus switches the contents distribution to carousel transmission. Namely, if the number of nodes receiving similar contents becomes large, the node capable of executing carousel transmission, e.g., the record instruction apparatus, is instructed to use carousel transmission.

The carousel transmission instruction request includes data (contents) identification of particular data received by the demand information provider apparatus and received a demand inquiry, and transmission source address information set to the inquiry. The node capable of executing carousel transmission generates a packet set with the address including the node address contained in the carousel transmission instruction request received from the demand information provider apparatus, e.g., multicast addresses and having the data corresponding to the data (contents) identification information as the payload, to thereafter start carousel transmission.

With reference to the process sequence shown in FIG. 31, description will be made on a process that the demand information provider apparatus makes the carousel transmission start in accordance with the contents demand level. Although two reproduction instruction apparatuses A and B are shown in FIG. 31 to reproduce the same data (contents), similar processes are performed even for the configuration that a number of nodes reproduce the same data (contents). At Step S711 a plurality of reproduction instruction apparatuses inquiry the demand information provider apparatus about the demand information. The demand information inquiry contains the identifier of the data (contents) to be inquired. The demand information provider apparatus stores as inquiry log information, the identifier of the data (contents) to be inquired and address information of the inquiring node as the inquiry source information.

At Step S712 the demand information provider apparatus provides the demand information as a response process to the inquiry source reproduction instruction apparatus. At Step S713 each reproduction instruction apparatus determines the data transmission mode in accordance with the demand information, generates the reproduction request packet set with the return probability as the reproduction rule judgment condition statement, and transmits the packet at Step S714.

The demand information provider apparatus counts the number of demand level inquiries received from the reproduction instruction apparatus and if it is judged that the number of received demand level exceeds the preset threshold value, then at Step S716 the carousel transmission start request is transmitted to the node 501 capable of executing carousel transmission.

The carousel transmission start request includes data (contents) identification of particular data received by the demand information provider apparatus and received a demand inquiry, and transmission source address information set to the inquiry.

At Step S717 the node 501 capable of executing carousel transmission generates a packet set with the address including the node address contained in the carousel transmission instruction request received from the demand information provider apparatus, e.g., multicast addresses and having the data corresponding to the data (contents) identification information as the payload, to thereafter start carousel transmission.

At Step S718 the reproduction instruction apparatus deinterleaves the reception data blocks to arrange the data order and FEC-decodes the deinterleaved data to recover the original data. The data recovery process using FEC and deinterleave process is the same as that previously described with reference to FIG. 14. Even if there are lost packets, the deinterleave process makes errors not the burst errors whose error portion has a large data area but the random errors having a small data area. Therefore, original data can be recovered by the FEC decoding process.

As described above, the demand information provider apparatus detects that the contents demand increases, and in accordance with this detection information, the carousel transmission start is controlled. It is therefore possible to switch to the carousel transmission under the state that respective reproduction instruction apparatuses receive the reproduction object data, and to reduce network traffics and improve the data transmission efficiency.

7. Hardware Structure of Information Processing Apparatus

Next, description will be made on an example of the hardware structure of the information processing apparatus constituting the node, record instruction apparatus, reproduction instruction apparatus and demand information provider apparatus in the above-described embodiments.

Figure 32:
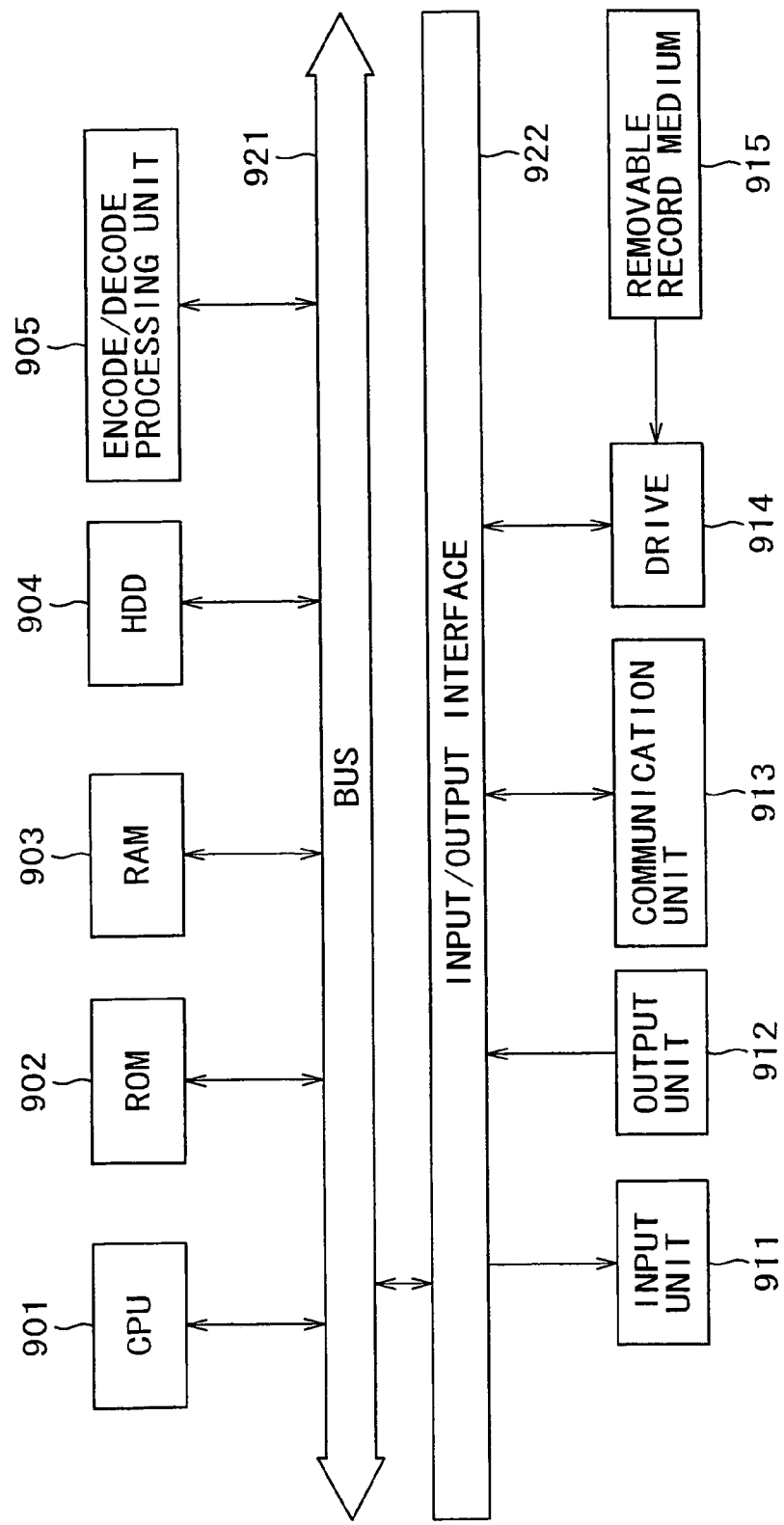
FIG. 32 is a diagram illustrating an example of a hardware structure of an information processing apparatus of the present invention.

FIG. 32 shows an example of an information processing apparatus having a CPU (Central Processing Unit) as a control means. The structure shown in FIG. 32 will be described. A CPU (Central Processing Unit) 901 is a processor for executing various programs. A ROM (Read-Only Memory) 902 stores programs to be executed by CPU 901 or fixed data as arithmetic parameters. A RAM (Random Access Memory) 903 is used as a storage area and a working area for programs to be executed by the processes of CPU 901 and parameters varying time to time during program processes.

An HDD 904 controls a hard disc and executes a storage process and a read process for various data and programs relative to a hard disc. An encode/decode processing unit 905 executes an encode process for transmission data such as contents and a decode process for reception data, in accordance with the above-described processes.

A bus 921 is constituted of a PCI (Peripheral Component Internet/Interface) bus or the like and allows data transfer relative to each input/output device via an input/output interface 822.

An input unit 911 is an input unit including, for example, a keyboard and a pointing device. If the input unit 911 is manipulated via the keyboard or a mouse or if data is received from a communication unit 913, an instruction is input to CPU 901 and a program stored in ROM (Read Only Memory) 902 is executed. An output unit 912 is, for example, a CRT, a liquid crystal display or the like, and displays various information as a text, image or the like.

The communication unit 913 performs communications between information processing apparatuses or other entities, and executes a process, under control of CPU 901, of transmitting data supplied from each storage unit or data processed by CPU 901 and encode/decode processing unit 905 and receiving data from other entities.

A drive 914 performs recording and reproducing of a removal recording medium 915 such as a flexible disc, a CD-ROM (Compact Disc Read Only Memory), an MO (magneto optical) disc, a DVD (Digital Versatile Disc), a magnetic disc and a semiconductor memory, and executes reproduction of a program or data from each removable recording medium 915 and storage of a program or data in each removable recording medium 915.

If a program or data recorded in each storage medium is executed or processed by CPU 901, the read program or data is supplied, for example, to a connected RAM 903 via the input/output interface 922 and bus 921.

Each process described in this specification can be executed by hardware, software or a compound structure of both. If a series of processes is executed by software, the program constituting this software may be stored in a program readable recording medium such as a flexible disc and a CD-ROM and supplied to a computer assembled with dedicated hardware or for example a general purpose personal computer capable of executing various functions by installing various programs, or alternatively the program may be downloaded via the communication network such as the Internet.

Specifically, the program may be stored in advance in a hard disc or a ROM (Read Only Memory) as the recording medium. Alternatively, the program may be stored temporarily or permanently in a removable recording medium such as a flexible disc, a CD-ROM (Compact Disc Read Only Memory), an MO (Magneto optical) disc, a DVD (Digital Versatile Disc), a magnetic disc and a semiconductor memory. Such a removable recording medium may be supplied as so-called package software.

In addition to installing the program from the above-described removal recording medium to the computer, the program may be transferred wireless to the computer from a download site or transferred with a wire to the computer via a network such as a LAN (Local Area Network) and the Internet. The computer receives the program transferred in such a manner and can install it in a built-in recording medium such as a hard disc.

It is conceivable that a camcorder, a personal vide recorder, a home gateway and the like are used as the information processing apparatus constituting the node, record instruction apparatus and reproduction instruction apparatus. Apparatuses having other structures may also be used if they have a record unit for recording data, a control unit for performing predetermined arithmetic calculations and a network interface for transmission and reception of data.

Although the record probability α and return probability β are recorded in packets, they may be recorded in an arbitrary recording apparatus or a packet, and each node is made to refer to the values. If the Reed Tornade encoding system is adopted as the FEC encoding, the interleave process may be omitted.

Various processes described in the specification may be not only time sequentially executed in accordance with the description, but also parallel executed in accordance with the processing ability of the apparatus executing the process or if necessary, or independently executed. In this specification, the system means a logical collection configuration of a plurality of apparatuses, and is not limited only to that the apparatuses having respective structures are accommodated in the same housing.

The present invention has been described in detail with reference to specific embodiments. However, it is obvious that the person skilled in this technical field can make modifications and alternatives without departing from the main features of the present invention. Namely, the present invention has been disclosed only illustratively and is not construed limitatively. In order to judge the main features of the present invention, the column of the scope of claims described at the start should be taken into consideration.

INDUSTRIAL APPLICABILITY

As described so far, according to the configuration of the present invention, in the configuration that a data reproduction process request is transmitted to a node connected to a network and a data reproduction process based on return data is executed, one or more data transmission modes are selected and a data transmission rate of each selected mode is determined, in accordance with a data demand level (popularity level), and data transmission is performed in accordance with the determined transmission mode. Accordingly, a selection and combination of the data transmission modes such as a carousel transmission mode, a chaining transmission mode, a distributed cache mode and a client server mode is possible and data transmission by an efficient and reliable data transmission mode can be realized.

According to the configuration of the present invention, if a reproduction process is executed, the instruction apparatus executes either the process of selecting a data transmission mode and determining a data transmission rate of each selected mode in accordance with the correspondence data possessed by the instruction apparatus between the demand level of the reproduction object data and the band rate as the data transmission rate of the adopted data transmission mode, or the process of determining a data transmission rate of each data transmission mode in accordance with the value of the demand level: x determined by the demand information by adopting a function group: $y=Dn(x)$ (where $\Sigma Dn(x)=1$) set by the demand level: x, the band rate: y for each transmission mode and the identification value: n of each data transmission mode. It is therefore possible to execute efficiently the process of determining the transmission mode in accordance with the demand level information.

Further, according to the configuration of the present invention, if the demand level of the reproduction object data is higher than the preset threshold value, executed is the process of setting the carousel transmission mode as the adopted data transmission mode. It is therefore possible to execute the process of automatically selecting and executing the carousel transmission suitable for data transfer corresponding to the data acquisition requests from a number of nodes.

Still further, according to the configuration of the present invention, the demand information provider apparatus for providing demand level information of transmission data over the network counts the number of demand level information acquisition requests from each network-connected node, and in accordance with the count information, generates and provide the demand level information for each data. It is therefore possible to grasp the demand level information in real time and supply the latest demand level information.

Furthermore, according to the configuration of the present invention, if the data demand level based upon the count information measured by the demand information provider apparatus for providing demand level information of transmission data over the network becomes equal to or larger than the preset threshold value, the transmission control for the carousel transmission process request for the data corresponding to the demand level equal to or larger than the preset threshold value is executed relative to the carousel transmission execution node. It is possible to realize the optimum data transmission control immediately dealing with an increase in the demand level.

The invention claimed is:

1. An information processing apparatus that transmits a data reproduction process request packet to a node connected to a network and executes a reproduction of reproduction object data, based on return data, the information processing apparatus comprising:
   a data transmission setting unit configured to determine a transmission percentage for each of one or more data transmission modes according to a demand level of the reproduction object data;
   a hardware processor configured to set an address in accordance with the one or more data transmission modes, to set a probability value based on a number of encoded blocks of the reproduction object data, to indicate to the node whether to execute a process to return the return data to the information processing apparatus, and to generate the data reproduction process request packet, which stores the probability value and a designation of the reproduction object data; and
   a network interface unit that transmits the data reproduction process request packet to the node at the address and receives the return data.

2. The information processing apparatus according to claim 1, wherein the one or more data transmission modes include a carousel transmission mode, a chaining transmission mode, a distributed cache mode, and a client server mode.

3. The information processing apparatus according to claim 2, wherein,
when the demand level of the reproduction object data is above a first predetermined threshold, the transmission percentage of the carousel transmission mode is 100%;
when the demand level of the reproduction object data is below the first predetermined threshold and above a second predetermined threshold, the transmission percentage of the carousel transmission mode is greater than 0% and less than 100%; and
when the demand level of the reproduction object data is below the second predetermined threshold and above a third predetermined threshold, a sum of the transmission percentage of the carousel transmission mode and the transmission percentage of the distributed cache mode is greater than 0% and less than 100%.

4. The information processing apparatus according to claim 3, wherein, when the demand level of the reproduction object data is below the third predetermined threshold, the transmission percentage of the client server mode is 100%.

5. The information processing apparatus according to claim 1, wherein the data transmission setting unit is configured to select a carousel transmission mode as one of the one or more data transmission modes, when the demand level of the reproduction object data is higher than a preset threshold value.

6. The information processing apparatus according to claim 1, further comprising:
a data recovery processing unit configured to execute a deinterleave process and an FEC decoding process on the return data to produce the reproduction object data.

7. The information processing apparatus according to claim 1, wherein the network interface unit receives the demand level of the reproduction object data.

8. An information processing apparatus that transmits a data reproduction process request packet to a node connected to a network and executes a reproduction of reproduction object data, based on return data, the information processing apparatus comprising:
a data transmission setting unit configured to select one or more data transmission modes as a return data transmission mode, from a plurality of data transmission modes, and to determine a transmission bandwidth percentage for each of the selected one or more data transmission modes according to a demand level of the reproduction object data;
a hardware processor configured to set the reproduction object data and an address in accordance with transmission bandwidth percentages determined by the data transmission setting unit, and to generate the data reproduction process request packet, which stores designation data for the reproduction object; and
a network interface unit configured to transmit the data reproduction process request packet generated by the hardware processor, wherein the return data stored at the node is encoded data at an encoding rate of q/p converted from a number of blocks p of divided data into a number of blocks q by FEC encoding, and the hardware processor is configured to set a probability value $\beta$ indicating that the node returns return data at a return probability $\beta$, such that $\beta$ is greater than $p/(\alpha \times n)$, where (1) $\alpha$ is a record probability designated by a record instruction apparatus connected to the network, (2) q is a number of encoded blocks q, (3) n is a number of network-connected nodes, and (4) p is the number of blocks p.

9. An information processing method for a reproduction instruction apparatus for transmitting a data reproduction process request packet to a node connected to a network and for executing a reproduction of reproduction object data, based on return data, the information processing method comprising:
determining a transmission percentage for each of one or more data transmission modes according to a demand level of the reproduction object data;
setting an address in accordance with the one or more data transmission modes;
generating, with a processor of the reproduction instruction apparatus, the data reproduction process request packet, which stores a probability value based on a number of encoded blocks of the reproduction object data, and a designation of the reproduction object data, the probability value indicating to the node whether to execute a process to return the return data to the reproduction instruction apparatus; and
transmitting the data reproduction process request packet to the node at the address to receive the return data.

10. The information processing method according to claim 9, wherein the one or more data transmission modes include a carousel transmission mode, a chaining transmission mode, a distributed cache mode, and a client server mode.

11. The information processing method according to claim 10, wherein,
when the demand level of the reproduction object data is above a first predetermined threshold, the transmission percentage of the carousel transmission mode is 100%;
when the demand level of the reproduction object data is below the first predetermined threshold and above a second predetermined threshold, the transmission percentage of the carousel transmission mode is greater than 0% and less than 100%; and
when the demand level of the reproduction object data is below the second predetermined threshold and above a third predetermined threshold, a sum of the transmission percentage of the carousel transmission mode and the transmission percentage of the distributed cache mode is greater than 0% and less than 100%.

12. The information processing method according to claim 11, wherein, when the demand level of the reproduction object data is below the third predetermined threshold, the transmission percentage of the client server mode is 100%.

13. The information processing method according to claim 9, wherein the determining includes selecting a carousel transmission mode as one of the one or more data transmission modes when the demand level of the reproduction object data is higher than a preset threshold value.

14. The information processing method according to claim 9, further comprising:
executing a deinterleave process and an FEC decoding process on the return data to produce the reproduction object data.

15. An information processing method for a reproduction instruction apparatus for transmitting a data reproduction process request packet to a node connected to a network and for executing a reproduction of reproduction object data, based on return data, the information processing method comprising:
selecting one or more data transmission modes as a return data transmission mode, from a plurality of data transmission modes;

determining a transmission bandwidth percentage for each of the selected one or more data transmission modes according to a demand level of the reproduction object data;

setting the reproduction object data and an address in accordance with transmission bandwidth percentages determined in the determining;

generating, with a processor of the reproduction instruction apparatus, the data reproduction process request packet, which stores designation data for the reproduction object data; and transmitting the packet generated by the generating, wherein the return data stored at the node is encoded data at an encoding rate of q/p converted from a number of blocks p of divided data into a number of blocks q by FEC encoding, and the generating includes setting a probability value $\beta$ indicating that the node returns the return data at a return probability $\beta$, such that $\beta$ is greater than $p/(q \times \alpha \times n)$, where (1) $\alpha$ is a record probability designated by a record instruction apparatus connected to the network, (2) q is a number of encoded blocks q, (3) n is a number of network-connected nodes, and (4) p is the number of blocks p.

* * * * *